(12) United States Patent
Damnjanovic et al.

(10) Patent No.: US 8,886,190 B2
(45) Date of Patent: Nov. 11, 2014

(54) METHOD AND APPARATUS FOR MEASURING CELLS IN THE PRESENCE OF INTERFERENCE

(75) Inventors: Aleksandar Damnjanovic, Del Mar, CA (US); Nathan Edward Tenny, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 3 days.

(21) Appl. No.: 13/267,735

(22) Filed: Oct. 6, 2011

(65) Prior Publication Data

US 2012/0108239 A1   May 3, 2012

Related U.S. Application Data

(60) Provisional application No. 61/391,443, filed on Oct. 8, 2010.

(51) Int. Cl.
| | |
|---|---|
| *H04W 36/30* | (2009.01) |
| *H04W 24/10* | (2009.01) |
| *H04L 5/00* | (2006.01) |
| *H04W 72/00* | (2009.01) |
| *H04W 84/04* | (2009.01) |
| *H04W 28/04* | (2009.01) |
| *H04W 36/08* | (2009.01) |

(52) U.S. Cl.
CPC .............. *H04W 24/10* (2013.01); *H04W 72/00* (2013.01); *H04L 5/0073* (2013.01); *H04W 36/30* (2013.01); *H04L 5/006* (2013.01); *H04L 5/0035* (2013.01); *H04W 84/045* (2013.01); *H04W 28/04* (2013.01); *H04L 5/0023* (2013.01); *H04W 36/08* (2013.01)
USPC .......................................... 455/436; 370/329

(58) Field of Classification Search
USPC ......... 455/436, 452.2, 450; 370/329; 375/260
See application file for complete search history.

(56) References Cited

U.S. PATENT DOCUMENTS

| | | | |
|---|---|---|---|
| 4,857,863 A | 8/1989 | Ganger et al. | |
| 5,051,625 A | 9/1991 | Ikeda et al. | |

(Continued)

FOREIGN PATENT DOCUMENTS

| | | |
|---|---|---|
| CN | 101018220 A | 8/2007 |
| CN | 101090281 A | 12/2007 |

(Continued)

OTHER PUBLICATIONS

3GPP TS 36.331 V8.5.0, Radio Resource Control (RRC); Protocol specification (Release 8), 204 pages, 2009.

(Continued)

*Primary Examiner* — Phuoc H Doan
(74) *Attorney, Agent, or Firm* — Arent Fox LLP

(57) ABSTRACT

Methods and apparatuses are provided that include determining measurement values for base stations based on signal measurements obtained over resources protected from interference by neighboring cells. The protected resources can be determined based on at least one of detecting at least a bimodal disparity in signal measurements received over the resources, receiving an indication of the protected resources, determining the resources as used for transmitting paging signals, determining the resources from a previous resource assignment, and/or the like. Thus, where a device is measuring cells for idle-mode reselection, such measurement of protected resources can provide for a more accurate measurement of characteristics of signals received from the base station.

37 Claims, 12 Drawing Sheets

(56) References Cited

U.S. PATENT DOCUMENTS

| | | |
|---|---|---|
| 5,587,678 A | 12/1996 | Dijkmans |
| 5,745,012 A | 4/1998 | Oka et al. |
| 5,748,019 A | 5/1998 | Wong et al. |
| 5,786,734 A | 7/1998 | Park |
| 5,949,259 A | 9/1999 | Garcia |
| 5,973,512 A | 10/1999 | Baker |
| 5,982,246 A | 11/1999 | Hofhine et al. |
| 6,040,744 A | 3/2000 | Sakurai et al. |
| 6,147,550 A | 11/2000 | Holloway |
| 6,167,240 A | 12/2000 | Carlsson et al. |
| 6,222,851 B1 | 4/2001 | Petry |
| 6,359,869 B1 | 3/2002 | Sonetaka |
| 6,504,830 B1 | 1/2003 | Ostberg et al. |
| 6,556,094 B2 | 4/2003 | Hasegawa et al. |
| 6,653,878 B2 | 11/2003 | Nolan |
| 6,677,799 B1 | 1/2004 | Brewer |
| 6,724,813 B1 | 4/2004 | Jamal et al. |
| 6,734,747 B1 | 5/2004 | Ishikawa et al. |
| 6,819,168 B1 | 11/2004 | Brewer |
| 6,819,195 B1 | 11/2004 | Blanchard et al. |
| 7,019,551 B1 | 3/2006 | Biesterfeldt |
| 7,129,798 B2 | 10/2006 | Aoyama et al. |
| 7,142,059 B2 | 11/2006 | Klein et al. |
| 7,420,395 B2 | 9/2008 | Kuramasu |
| 7,630,339 B2 | 12/2009 | Laroia et al. |
| 7,652,533 B2 | 1/2010 | Wang et al. |
| 7,710,212 B2 | 5/2010 | Seliverstov |
| 7,742,444 B2 | 6/2010 | Mese et al. |
| 7,786,779 B2 | 8/2010 | Chang et al. |
| 7,795,902 B1 | 9/2010 | Yella |
| 7,817,666 B2 | 10/2010 | Spinar et al. |
| 7,843,886 B2 | 11/2010 | Johnson et al. |
| 7,859,314 B2 | 12/2010 | Rutkowski et al. |
| 7,924,066 B2 | 4/2011 | Gagne et al. |
| 7,940,740 B2 | 5/2011 | Krishnamurthy et al. |
| 8,010,151 B2 | 8/2011 | Kim et al. |
| 8,058,928 B2 | 11/2011 | Terzioglu |
| 8,077,670 B2 | 12/2011 | Fan et al. |
| 8,085,875 B2 | 12/2011 | Gore et al. |
| 8,155,069 B2 | 4/2012 | Chun et al. |
| 8,174,995 B2 | 5/2012 | Malladi |
| 8,228,827 B2 | 7/2012 | Jeong et al. |
| 8,446,869 B2 | 5/2013 | Lee et al. |
| 2005/0064873 A1 | 3/2005 | Karaoguz et al. |
| 2005/0096061 A1 | 5/2005 | Ji et al. |
| 2005/0254555 A1 | 11/2005 | Teague et al. |
| 2005/0260990 A1 | 11/2005 | Huang et al. |
| 2006/0098604 A1 | 5/2006 | Flammer et al. |
| 2006/0166693 A1 | 7/2006 | Jeong et al. |
| 2007/0153719 A1 | 7/2007 | Gopal |
| 2007/0167181 A1 | 7/2007 | Ramesh et al. |
| 2007/0242763 A1 | 10/2007 | Li et al. |
| 2007/0253355 A1 | 11/2007 | Hande et al. |
| 2008/0008212 A1 | 1/2008 | Wang et al. |
| 2008/0056193 A1 | 3/2008 | Bourlas et al. |
| 2008/0075032 A1 | 3/2008 | Balachandran et al. |
| 2008/0106297 A1 | 5/2008 | Jao |
| 2008/0130588 A1 | 6/2008 | Jeong et al. |
| 2008/0205322 A1 | 8/2008 | Cai et al. |
| 2008/0212514 A1 | 9/2008 | Chen |
| 2008/0220791 A1 | 9/2008 | Cho et al. |
| 2008/0227449 A1 | 9/2008 | Gholmieh et al. |
| 2008/0253300 A1 | 10/2008 | Wakabayashi et al. |
| 2008/0254804 A1 | 10/2008 | Lohr et al. |
| 2008/0260000 A1 | 10/2008 | Periyalwar et al. |
| 2008/0268859 A1 | 10/2008 | Lee et al. |
| 2008/0285513 A1 | 11/2008 | Jung et al. |
| 2009/0069023 A1 | 3/2009 | Ahn et al. |
| 2009/0088175 A1 | 4/2009 | Pelletier et al. |
| 2009/0109915 A1 | 4/2009 | Pasad et al. |
| 2009/0135769 A1 | 5/2009 | Sambhwani et al. |
| 2009/0154458 A1 | 6/2009 | Kim et al. |
| 2009/0175214 A1 | 7/2009 | Sfar et al. |
| 2009/0196165 A1 | 8/2009 | Morimoto et al. |
| 2009/0196250 A1 | 8/2009 | Feng et al. |
| 2009/0197631 A1 | 8/2009 | Palanki et al. |
| 2009/0201880 A1 | 8/2009 | Aghili et al. |
| 2009/0213769 A1 | 8/2009 | Shen et al. |
| 2009/0238117 A1 | 9/2009 | Somasundaram et al. |
| 2009/0252077 A1 | 10/2009 | Khandekar et al. |
| 2009/0257371 A1 | 10/2009 | Nishio |
| 2009/0257390 A1 | 10/2009 | Ji et al. |
| 2009/0264077 A1 | 10/2009 | Damnjanovic |
| 2009/0268684 A1 | 10/2009 | Lott et al. |
| 2009/0274086 A1 | 11/2009 | Petrovic et al. |
| 2009/0312024 A1 | 12/2009 | Chen et al. |
| 2009/0325626 A1 | 12/2009 | Palanki et al. |
| 2010/0008282 A1 | 1/2010 | Bhattad et al. |
| 2010/0022250 A1 | 1/2010 | Petrovic et al. |
| 2010/0029282 A1 | 2/2010 | Stamoulis et al. |
| 2010/0034135 A1 | 2/2010 | Kim et al. |
| 2010/0034158 A1 | 2/2010 | Meylan |
| 2010/0035600 A1 | 2/2010 | Hou et al. |
| 2010/0067472 A1 | 3/2010 | Ball et al. |
| 2010/0069076 A1 | 3/2010 | Ishii et al. |
| 2010/0080154 A1 | 4/2010 | Noh et al. |
| 2010/0091919 A1 | 4/2010 | Xu et al. |
| 2010/0110964 A1 | 5/2010 | Love et al. |
| 2010/0144317 A1 | 6/2010 | Jung et al. |
| 2010/0232373 A1 | 9/2010 | Nory et al. |
| 2010/0240386 A1* | 9/2010 | Hamabe et al. ............ 455/452.2 |
| 2010/0246521 A1 | 9/2010 | Zhang et al. |
| 2010/0254268 A1 | 10/2010 | Kim et al. |
| 2010/0254329 A1 | 10/2010 | Pan et al. |
| 2010/0254344 A1 | 10/2010 | Wei et al. |
| 2010/0265870 A1 | 10/2010 | Cai et al. |
| 2010/0272059 A1 | 10/2010 | Bienas et al. |
| 2010/0290372 A1 | 11/2010 | Zhong et al. |
| 2010/0304665 A1 | 12/2010 | Higuchi |
| 2010/0309803 A1 | 12/2010 | Toh et al. |
| 2010/0309867 A1 | 12/2010 | Palanki et al. |
| 2010/0309876 A1 | 12/2010 | Khandekar et al. |
| 2010/0322180 A1 | 12/2010 | Kim et al. |
| 2010/0323611 A1 | 12/2010 | Choudhury |
| 2010/0331030 A1 | 12/2010 | Nory et al. |
| 2011/0007673 A1 | 1/2011 | Ahn et al. |
| 2011/0013554 A1 | 1/2011 | Koskinen |
| 2011/0032890 A1 | 2/2011 | Wu |
| 2011/0038271 A1 | 2/2011 | Shin et al. |
| 2011/0044227 A1 | 2/2011 | Harrang et al. |
| 2011/0044261 A1 | 2/2011 | Cai et al. |
| 2011/0053603 A1 | 3/2011 | Luo et al. |
| 2011/0064037 A1 | 3/2011 | Wei et al. |
| 2011/0116364 A1 | 5/2011 | Zhang et al. |
| 2011/0134875 A1 | 6/2011 | Ding et al. |
| 2011/0149771 A1 | 6/2011 | Abeta et al. |
| 2011/0170503 A1 | 7/2011 | Chun et al. |
| 2011/0182245 A1 | 7/2011 | Malkamaki et al. |
| 2011/0188481 A1 | 8/2011 | Damnjanovic et al. |
| 2011/0190024 A1 | 8/2011 | Seong et al. |
| 2011/0194514 A1 | 8/2011 | Lee et al. |
| 2011/0201279 A1 | 8/2011 | Suzuki et al. |
| 2011/0205982 A1 | 8/2011 | Yoo et al. |
| 2011/0211503 A1 | 9/2011 | Che et al. |
| 2011/0243075 A1 | 10/2011 | Luo et al. |
| 2011/0249643 A1 | 10/2011 | Barbieri et al. |
| 2011/0268032 A1 | 11/2011 | Kim et al. |
| 2011/0274066 A1 | 11/2011 | Tee et al. |
| 2011/0275394 A1 | 11/2011 | Song et al. |
| 2011/0310830 A1 | 12/2011 | Wu et al. |
| 2011/0317624 A1 | 12/2011 | Luo et al. |
| 2012/0026892 A1 | 2/2012 | Nakao et al. |
| 2012/0033588 A1 | 2/2012 | Chung et al. |
| 2012/0033627 A1 | 2/2012 | Li et al. |
| 2012/0033647 A1 | 2/2012 | Moon et al. |
| 2012/0039180 A1 | 2/2012 | Kim et al. |
| 2012/0087250 A1 | 4/2012 | Song et al. |
| 2012/0088516 A1 | 4/2012 | Ji et al. |
| 2012/0093095 A1 | 4/2012 | Barbieri et al. |
| 2012/0093097 A1 | 4/2012 | Che et al. |
| 2012/0106481 A1 | 5/2012 | Cho et al. |
| 2012/0182958 A1 | 7/2012 | Pelletier et al. |
| 2012/0212260 A1 | 8/2012 | Chen et al. |
| 2012/0236798 A1 | 9/2012 | Raaf et al. |

(56) References Cited

U.S. PATENT DOCUMENTS

| | | | |
|---|---|---|---|
| 2012/0281656 A1 | 11/2012 | Hooli et al. |
| 2013/0005344 A1 | 1/2013 | Dimou et al. |
| 2013/0077543 A1 | 3/2013 | Kim et al. |
| 2013/0229933 A1 | 9/2013 | Ji et al. |
| 2013/0250927 A1 | 9/2013 | Song |
| 2014/0036838 A1 | 2/2014 | Yoo et al. |

FOREIGN PATENT DOCUMENTS

| | | |
|---|---|---|
| CN | 101483511 A | 7/2009 |
| CN | 101505498 A | 8/2009 |
| EP | 1811711 A1 | 7/2007 |
| EP | 2076066 | 7/2009 |
| JP | H06350514 A | 12/1994 |
| JP | 09501038 A | 1/1997 |
| JP | 09327060 A | 12/1997 |
| JP | H1118144 A | 1/1999 |
| JP | 2001231077 A | 8/2001 |
| JP | 2003-506960 A | 2/2003 |
| JP | 2005-277570 A | 10/2005 |
| JP | 2006345405 A | 12/2006 |
| JP | 2007529915 A | 10/2007 |
| JP | 2008017325 A | 1/2008 |
| JP | 2008500764 A | 1/2008 |
| JP | 2008172357 A | 7/2008 |
| JP | 2008301493 A | 12/2008 |
| JP | 2009527939 A | 7/2009 |
| JP | 2010506446 A | 2/2010 |
| JP | 2010081446 A | 4/2010 |
| JP | 2010519784 A | 6/2010 |
| JP | 2010536256 A | 11/2010 |
| JP | 2010541492 A | 12/2010 |
| JP | 2011505088 A | 2/2011 |
| JP | 2011507391 A | 3/2011 |
| JP | 2011-516000 A | 5/2011 |
| JP | 2013502841 A | 1/2013 |
| KR | 20100018453 A | 2/2010 |
| RU | 2305902 C2 | 9/2007 |
| RU | 2007105748 A | 8/2008 |
| WO | WO 01-11804 A1 | 2/2001 |
| WO | WO 2004-066104 A2 | 8/2004 |
| WO | WO-2004079949 A1 | 9/2004 |
| WO | WO-2005019705 A1 | 3/2005 |
| WO | WO-2005062798 A2 | 7/2005 |
| WO | WO2005109705 | 11/2005 |
| WO | 2005117283 A2 | 12/2005 |
| WO | WO-2006020021 A1 | 2/2006 |
| WO | WO-2006099546 A1 | 9/2006 |
| WO | WO-2007080892 A1 | 7/2007 |
| WO | WO2007097671 A1 | 8/2007 |
| WO | WO2007108630 A1 | 9/2007 |
| WO | 2007129620 A1 | 11/2007 |
| WO | WO-2008024751 A2 | 2/2008 |
| WO | 2008040448 A1 | 4/2008 |
| WO | 2008041819 A2 | 4/2008 |
| WO | 2008057969 | 5/2008 |
| WO | 2008081816 A1 | 7/2008 |
| WO | 2008086517 | 7/2008 |
| WO | WO-2008116128 A2 | 9/2008 |
| WO | 2009011059 A1 | 1/2009 |
| WO | WO2009016260 A1 | 2/2009 |
| WO | WO-2009020926 A1 | 2/2009 |
| WO | WO2009022295 | 2/2009 |
| WO | WO2009038367 | 3/2009 |
| WO | 2009046061 A2 | 4/2009 |
| WO | WO2009043002 | 4/2009 |
| WO | WO-2009048246 A2 | 4/2009 |
| WO | WO2009062115 | 5/2009 |
| WO | WO2009064147 A2 | 5/2009 |
| WO | WO2009065075 A1 | 5/2009 |
| WO | 2009071583 A1 | 6/2009 |
| WO | WO-2009067842 A1 | 6/2009 |
| WO | WO2009078795 A1 | 6/2009 |
| WO | 2009089798 A1 | 7/2009 |
| WO | WO2009088251 A2 | 7/2009 |
| WO | WO2009096846 A1 | 8/2009 |
| WO | WO-2009126586 A2 | 10/2009 |
| WO | WO2009152866 A1 | 12/2009 |
| WO | WO-2010006285 A2 | 1/2010 |
| WO | WO-2010016607 A1 | 2/2010 |
| WO | WO2010016726 A2 | 2/2010 |
| WO | WO-2010032791 A1 | 3/2010 |
| WO | WO2010033957 A2 | 3/2010 |
| WO | WO 2010-044903 A2 | 4/2010 |
| WO | WO2011034966 A1 | 3/2011 |
| WO | 2010110840 A2 | 10/2011 |

OTHER PUBLICATIONS

Ericsson: "Structure of System Information", TSGR2#4(99)414, 5 pages, May 1999.

Garcia F., et al, "Design of a slew rate controlled output buffer", ASIC Conference 1998. Proceedings. Eleventh Annual IEEE International Rochester, NY, USA Sep. 13-16, 1998, NY, USA. IEEE, US, Sep. 13, 1998, pp. 147-150, XP010309693, DOI: 10.1109/ASIC.1998. 722821 ISBN: 978-0-7803-4980-3.

International Search Report and Written Opinion—PCT/US2011/ 055380—ISA/EPO—Dec. 23, 2011.

Alcatel-Lucent Shanghai Bell et al., "Multi-cell cooperative RS in CoMP", 3GPP Draft; R1-092317, 3rd Generation Partnership Project (3GPP), Mobile Competence Centre; 650, Route Des Lucioles; F-06921 Sophia-Antipolis Cedex; France; No. Los Angeles, USA; Jun. 24, 2009, XP050350848, [retrieved on Jun. 24, 2009].

Huawei: "Discussion on OTDOA based positioning issue", 3GPP Draft; R1-092355, 3rd Generation Partnership Project (3GPP), Mobile Competence Centre; 650, Route Des Lucioles; F-06921 Sophia-Antipolis Cedex; France, No. Los Angeles, USA, Jun. 24, 2009, XP050350879; [retrieved on Jun. 24, 2009].

3GPP: "3rd Generation Partnership Project; Technical Specification Group Radio Access Network; Evolved Universal Terrestrial Radio Access (E-UTRA); Physical Layer procedures (Release 8)" 3GPP TS 36.213 V8.7.0 (May 2009) Technical Specification, No. V8.7.0, Jun. 8, 2009, pp. 1-77, XP002602609.

3GPP: "3rd Generation Paternship Project; Technical Specification Group Radio Access Network; Evolved Universal Terrestrial Radio Access (E-UTRA); Services provided by the phyiscal layer (Release 8)", 3GPP Standard; 3GPP TS 36.302, 3rd Generation Partnership Project (3GPP), Mobile Competence Centre; 650, Route Des Lucioles; F-06921 Sophia-Antipolis Cedex; France, No. V8.1.0, Mar. 1, 2009, pp. 1-17, XP050377589.

3GPP: "3rd Generation Partnership Project; Technical Specification Group Radio Access Network; Further Advancements for E-UTRA Physical Layer Aspects (Release 9)", 3GPP Draft; TR 363814_110, 3rd Generation Partnership Project (3GPP), Antipolis Cedex; France No. San Francisco, USA; 20090509, May 9, 2009, pp. 1-34, XP050339706, [retrieved on May 9, 2009].

3rd Generation Partnership Project: "3rd Generation Partnership Project; Technical Specification Group Radio Access Network; Evolved Universal Terrestrial Radio Access (E-UTRA) Medium Access Control (MAC) protocol specification (Release 8); 3GPP TS 36.321 V8.5.0"3GPP TS 36.321 V8.5.0,, [Online] vol. 36.321, No. V8.5.0, Mar. 1, 2009, pp. 1-46, XP002555765 Internet Retrieved from the Internet: URL:http://www.3gpp.orq/ftp/Specs/html-inf 0/36321.htm> [retrieved on Oct. 21, 2009] Sections 5.1.1 to 5.1.6.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) 3GPP Standard; 3GPP TS 36.300, 3rd Generation Partnership Project (3GPP), Mobile Competence Centre; 650, Route Des Lucioles; F-06921 Sophia-Antipolis Cedex; France, No. V8.8.0, Mar. 1, 2009, pp. 1-157, XP050377583, p. 45, line 3-p.50, line 15.

Ericsson: 3GPP Draft; R3-083577, 3rd Generation Partnership Project (3GPP), Mobile Competence Centre; 650, Route Des Lucioles; F-06921 Sophia-Antipolis Cedex; France, No. Prague, Czech Republic; 20081125, Nov. 25, 2008, XP050324756 [retrieved on Nov. 25, 2008] Section 10.1.5.1.

(56) References Cited

OTHER PUBLICATIONS

Ericsson: "Simultaneous reception of transport channels in the LTE", 3GPP Draft; 36302_CR009_(REL-8) R2-093578, 3rd Generation Partnership Project (3GPP), Mobile Competence Centre; 650, Route Des Luciolcs; F-06921 Sophia-Antipolis Cedex; France, No. San Francisco, USA; 20090509, May 9, 2009, pp. 1-3, XP050340488, [retrieved on May 9, 2009].
Fujitsu, "An Efficient Reference Signal Design in LTE Advanced", 3GPP Draft; R1-090949, 3rd Generation Partnership Project (3GPP), Mobile Competence Centre; 650, Route Des Luciolcs, F-06921 Sophia-Antipolis Cedex; France; No. Athens, Greece, 20090206, Feb. 6, 2009, XP050318788.
Gale et al., "Distributed discreate resource optimization in Heterogeneous networks", 2008, pp. 560-564, IEEE 04641670.
Huawei : "Enhanced ICIC for control channels to support Het.Net,", 3GPP TSG RAN WG1 meeting #61 R1-103126, May 14, 2010, pp. 1-8, XP002660456, Montreal , Canada Retrieved from the Internet : URL:http://ftp.3gpp.org/ftp/tsg-ran/WGI-RL 1/TSGR1_61/Docs/ [retrieved on Sep. 30, 2011].
Huawei: "CQI Enhancement for Interference Varying Environments", 3GPP Draft; R1-101061 CQI Enhancement for Interference Varying Environments Ver (Final), 3rd Generation Partnership Project (3GPP), Mobile Competence Centre; 650, Route Des Luciolcs; F-06921 Sophia-Antipolis Cedex; France, vol. RAN WGI, No. San Francisco, USA; 20100222, Feb. 16, 2010. XP050418632, [retrieved on Feb. 16, 2010].
Huawei: "Enhanced ICIC and Resource-Specific CQI Measurement", 3GPP Draft; R1-101981, 3rd Generation Partnership (3GPP), Mobile Competence Centre; 650, Route Des Luciolcs; F-06921 Sophia-Antipolis Cedex; France. vol. RAN WGI, No. Beijing, China; 20100412, Apr. 6, 2010, XP050419318, [retrieved on Apr. 6, 2010].
Huawei: "R-PDCCH Design" 3GPP Draft; R1-093042 R-PDCCH Design, 3rd Generation Partnership Project (3GPP), Mobile Competence Centre; 650, Route Des Luciolcs; F-06921 Sophia-Antipolis Cedex; France, No. Shenzhen, China; 20090818, Aug. 18, 2009, XP050351434 [retrieved on Aug. 18, 2009]p. 1, paragraph 1.
Inoue et al., "Space time transmit site diversity for OFDM multi base station system", 2002, pp. 30-34, IEEE 01045691.
Kulkarni P., et al., "Radio Resource Management Considerations for LTE Femto Cells", ACM SIGCOMM Computer Communication Review, vol. 40, No. 1, Jan. 2010, pp. 26-30.
LG Electronics Inc: "MAC Random Access Response Extension" 3GPP Draft; R2-085237 MAC RAR Extension, 3rd Generation Partnership Project (3GPP), Mobile Competence Centre; 650, Route Des Luciolcs; F-06921 Sophia-Antipolis Cedex; France, No. Prague, Czech Republic; 20080923, Sep. 23, 2008, XP050320136, [retrieved on Aug. 23, 2008] the whole document.
Panasonic: "PDCCH with cross component carrier assignment", 3GPP Draft; R1-093597 (Update of R1-093464), 3rd Generation Partnership Project (3GPP), Mobile Competence Centre; 650, Route Des Luciolcs; F-06921 Sophia-Antipolis Cedex; France, No. Shenzhen, China; 20090824, Aug, 24, 2009, XP050388168, [retrieved on Aug. 22, 2009].
Potevio: "Considerations on the Resource Indiciation of R-PDCCH" 3GPP Draft; R1-093443 Considerations on the Resources Indication of R-PDCCH, 3rd Generation Partnership Project (3GPP), Mobile Competence Centre; 650, Route des Luciolcs; F-06921 Sophia-Antipolis Cedex; France, No. Shenzhen, China; 20090818, Aug. 18, 2009, XP050351718 [retrieved on Aug. 18, 2009]p. 1, paragraph 1-paragraph 2.
Qualcomm Europe: "Carrier Aggregation in Heterogeneous Networks", 3GPP Draft; R1-092239, 3rd Generation Partnership Project (3GPP), Mobile Competence Centre; 650 Route Des Luciolcs; F-06921 Sophia-Antipolis Cedex; France, No. San Francisco, USA; 20090508, May 8, 2009, XP050339658, [retrieved on May 8, 2009].
Qualcomm Inc., "Introduction of time domain ICIC", R2-106943, 3GPP TSG-RAN WG2 Meeting #72, Jacksonville, US, Nov. 15-19, 2010, pp. 4.
Qualcomm Inc., "RRM/RLM resource restriction for time domain ICIC", R2-110698, 3GPP TSG-RAN WG2 Meeting #72-bis, Dublin, Ireland, January 17-21, 2011, pp. 8.
Qualcomm Incorporated: "Extending Rel-8/9 ICIC into Rel-10", 3GPP Draft; R1-101505 Extending REL-8-9 ICIC into REL-10, 3rd Generation Partnership Project (3GPP), Mobile Competence Centre; 650, Route Des Luciolcs; F-06921 Sophia-Antipolis Cedex; France, vol. RAN WG1, No. San Francisco, USA; 20100222, Feb. 16, 2010, XP050418951, [retrieved on Feb. 16, 2010].
Samsung: "Clarification on the parallel receptions for PDSCHs", 3GPP Draft; 36302_CR0010 (REL-8) R2-093579, 3rd Generation Partnership Project (3GPP), Mobile Competence Centre; 650, Route Des Luciolcs; F-06921 Sophia-Antipolis Cedex; France, No. San Francisco, USA; 20090519, May 19, 2009, pp. 1-2, XP050340489, [retrieved on May 19, 2009].
Samsung: "Downlink Subframe Alignment in Type I Relay" 3GPP Draft; R1-093386 Downlink Subframe Alignment in Type I Relay, 3rd Generation Partnership Project (3GPP), Mobile Competence Centre; 650, Route Des Luciolcs; F-06921 Sophia-Antipolis Cedex; France, No. Shenzhen, China; 20090819, Aug. 19, 2009, XP050351683 [retrieved on Aug. 19, 2009] p. 1, paragraph 1.
Samsung: "Inbound mobility to H(e)NBs" 3GPP Draft; R2-093250_Inb0und Mobility to H(E)NBS-R4, 3rd Generation Partnership Project (3GPP), Mobile Competence Centre; 650, Route Des Luciolcs; F-06921 Sophia-Antipolis Cedex; France, No. San Francisco, USA; 20090428, Apr. 28, 2009, XP050340933 [retrieved on Apr. 28, 2009] the whole document.
Vice Chairman: "Report of E-UTRA control plane session" 3GPP Draft; R2-082841-Chair-Report-RAN2-62-LTE-CP, 3rd Generation Partnership Project (3GPP), Mobile Competence Centre; 650, Route Des Luciolcs; F-06921 Sophia-Antipolis Cedex; France, TSG-RAN WG2, No. Kansas City, USA; 20080514, May 14, 2008, XP050140403 [retrieved on MAy 14, 2008].
Young Jin Sang, et al., "A Self-Organized Femtocell for IEEE 802.16e System", Global Telecommunications Conference, 2009. GLOBECOM 2009. IEEE, IEEE, Piscataway, NJ, USA, Nov. 30, 2009, pp. 1-5, XP031646102, ISBN: 978-1-4244-4148-8.
Qualcomm Europe: "DL Carrier Aggregation Performance in Heterogeneous Networks", [online], 3GPP TSG-RAN WG1#58, R1-093145, URL: http://www.3gpp.org/ftp/tsg_ran/WG1_RL1/TSGR1_58/Docs/R1-093145.zip.
Taiwan Search Report—TW099118958—TIPO—May 29, 2013.
3GPP TS 36.355 V9.0.0, Technical Specification Group Radio Access Network, E-UTRA, "LTE Positioning Protocal (LLP) (Release 9)" Dec. 2009, 31 pages.
Alcatel-Lucent, "Interference Coordination Framework with Results", 3GPP TSG RAN WG1 Meeting #49bis, R1-07-3187, Jun. 29, 2007, pp. 1-9.
Huawei, "Consideration on CSI-RS design for CoMP and text proposal to 36.841", 3GPP TSG-RAN WG1#57b R1-092364, Los Angeles, USA, Jun. 29-Jul. 3, 2009.
LG Electronics: "Coordination for DL control channel in co-channel HeNB deployment", 3GPP Draft; R1-102429 Control Channel in HetNet, 3rd Generation Partnership Project (3GPP), Mobile Competence Centre ; 650, Route Des Luciolcs ; F-06921 Sophia-Antipolis Cedex ; France, vol. RAN WG1, No. Beijing, china; 20100412, Apr. 6, 2010, XP050419640, [retrieved on Apr. 6, 2010].
NTT DoCoMo: "Interference Coordination for Non-CA-based Heterogeneous Networks", 3GPP Draft; R1-102307 ICIC for Non-CA HetNet, 3rd Generation Partnership Project (3GPP), Mobile Competence Centre ; 650, Route Des Luciolcs ; F-06921 Sophia-Antipolis Cedex ; France, vol. RAN WG1, No. Beijing, china; 20100412, Apr. 7, 2010, XP050419698, [retrieved on Apr. 7, 2010].
NTT DoCoMo, "Performance Evaluations for Heterogeneous Networks", 3GPP TSG RAN WG1 Meeting #60, R1-101226, Feb. 26, 2010, pp. 1-18.
Qualcomm Europe: "Coordinated Multi-Point downlink transmission in LTE-Advanced" 3GPP Draft; R1-084400 COMP, 3rd Generation Partnership Project (3GPP), Mobile Competence Centre; 650, Route Des Luciolcs ; F-06921 Sophia-Antipolis Cedex; France, No. Prague, Czech Republic; 20081105, Nov. 5, 2008, XP050317663.

(56) References Cited

OTHER PUBLICATIONS

3GPP: "LS on RV Determination for BCCH," 3GPP TSG RAN WG1 Meeting #54bis, Sep. 29, 2008, R1-084067, <URL: http://www.3gpp.org/ftp/tsg_ran/WG1_RL1/TSGR1_54b/Docs/R1-084067.zip>.

3GPP TSG-RAN WG2 Meeting #68 R2-096531, "Email discussion on MBMS value range [67b#14]", Nov 9-13, 2009, Jeju, Korea, Discussion and Decision, <URL: http://www.3gpp.org/ftp/tsg_ran/WG2_RL2/TSGR2_68/Docs/R2-096531.zip>, p. 1-13.

CATT, Addition of MBSFN information on X2 interface,[online],3GPPTSG-RAN3 Meeting #64,May 4, 2009,R3-091247,Internet<URL:http://www.3gpp.org/ftp/tsg_ran/WG3_lu/TSGR3_64/Docs/R3-091247.zip>, p. 1-14.

LG Electronics: "Considerations on interference coordination in heterogeneous networks", 3GPP Draft ; R1-101369, 3rd Generation Partnership Project (3GPP), Mobile Competence Centre; 650, Route Des Lucioles ; F-06921 Sophia-Antipolis Cedex ; France, vol. RAN WGI, No. San Francisco, USA; 20100222-20100226, Feb. 16, 2010, XP050418854, pp. 1-5.

Motorola: "DCI Format 1C with implicit RV and TBS," 3GPP TSG RAN1 #54, Aug, 18, 2008, R1-083207, 5 pages, <URL:http://www.3gpp.org/ftp/tsg_ran/WG1_RL1/TSGR1_54/Docs/R1-083207.zip>.

NTT DoCoMo: "Downlink Interference Coordination Between eNodeB and home eNodeB", 36PP Draft; R1-101225 HENB_ICIC, 3rd Generation Partnership Project (3GPP), Mobile Competence Centre ; 650, Route Des Lucioles ; F-06921 Sophia-Antipolis Cedex ; France. vol. RAN WGI, No. San Francisco, USA; 20100222, Feb. 16, 2010, XP050418740, [retrieved on Feb. 16, 2010]., p. 1-8.

Texas Instruments: "Issues on Carrier Aggregation for Advanced E-UTRA", 3GPP Draft, R1-090280 TI Carrier AGGR, 3rd Generation Partnership Project (3GPP), Mobile Competence Centre, 650, Route Des Lucioles, F-06921 Sophia-Antipolis Cedex, France, No. Ljubljana, 20090107, Jan. 7, 2009, XP050318205, pp. 1-5, [retrieved on Jan. 7, 2009].

3GPP TSG RAN WG2 62bis Tdoc R2-083147. "E-UTRA UE Radio Measurement Reporting for Uplink ICIC". Ericsson. Discussion and Decision. 2 pages. Warsaw, Poland, USA, Jun. 30-Jul. 4, 2008.

3GPP TSG RAN WG1 56bis R1-091459. "Carrier Aggregation in Heterogeneous Networks". Qualcomm Europe. Discussion and Decision. pp. 1-12. Seoul. Korea. Mar. 23-27, 2009.

3GPP TSG RAN WG1 Meeting 57. R1-092184. "Interference under Type 1 RN". LG-Nortel. Discussion and Decision. 14 pages. San Francisco, USA. May 4, 2009.

* cited by examiner

METHOD AND APPARATUS FOR MEASURING CELLS IN THE PRESENCE OF INTERFERENCE

CLAIM OF PRIORITY UNDER 35 U.S.C. §119

The present Application for patent claims priority to Provisional Application No. 61/391,443, entitled "RANKING CELLS WITH TIME-DOMAIN SELECTIVE INTERFERENCE" filed Oct. 8, 2010, assigned to the assignee hereof and hereby expressly incorporated by reference herein.

BACKGROUND

1. Field

The following description relates generally to wireless network communications, and more particularly to measuring cells for handover.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

To supplement conventional base stations, additional restricted base stations can be deployed to provide more robust wireless coverage to mobile devices. For example, wireless relay stations and low power base stations (e.g., which can be commonly referred to as Home NodeBs or Home eNBs, collectively referred to as H(e)NBs, femto nodes, pico nodes, etc.) can be deployed for incremental capacity growth, richer user experience, in-building or other specific geographic coverage, and/or the like. In some configurations, such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection.

For example, low power base stations can be deployed within macrocell base station coverage areas, which can result in multiple levels of interference where the base stations operate in a similar and/or adjacent frequency spectrum, such as interference to devices communicating therewith, interference to the low power base stations and macrocell base station from devices communicating therewith, etc. Resource partitioning schemes, such as enhanced inter-cell interference coordination (eICIC), have been implemented to allow the low power base stations and macrocell base stations to negotiate transmission (and/or reception) radio resources to avoid such interference. In these schemes, a low power base station can schedule device communications in different time periods than the macrocell base station uses to schedule devices. For idle-mode devices measuring cells for reselection, however, the base stations may not have control over which resources the devices measure, which can lead to inaccurate cell measurements.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with selecting measurements of a cell to generate a measurement value for the cell. In an example, some resources over which the signals are transmitted in the cell can be interfered by signals from another cell. Where measurements are performed over such resources, the measurements can be ignored or otherwise diminished, as the interfered measurements may not be an accurate indication of signal characteristics experienced when communicating in the cell. In another example, the interfered resources can be obtained before performing measurements, and measurements over the interfered resources can be avoided. In any case, a cell measurement can be determined from measurements performed over resources without substantial interference to improve evaluation of the cell for idle-mode reselection.

According to an example, a method of wireless communication is provided that includes determining a portion of protected resources from a set of resources related to a base station and obtaining signal measurements of one or more signals from the base station over at least the portion of the protected resources. The method further includes generating a measurement value of the base station for cell reselection based on the signal measurements.

In another aspect, an apparatus for measuring base station signals is provided. The apparatus includes at least one processor configured to determine a portion of protected resources from a set of resources related to a base station and. The at least one processor is further configured to select a measurement type for measuring the signals based at least in part on the change in location. The apparatus also includes a memory coupled to the at least one processor.

In yet another aspect, an apparatus for measuring neighboring cells in wireless communications is provided that includes means for determining to measure signals from one or more neighboring cells and means for determining a change in location since a previous measurement. The apparatus further includes means for selecting a measurement type for measuring the signals based at least in part on the change in location.

Still, in another aspect, a computer-program product for measuring neighboring cells in wireless communications is provided including a computer-readable medium having code for causing at least one computer to determine to measure signals from one or more neighboring cells and code for causing the at least one computer to determine a change in location since a previous measurement. The computer-readable medium further includes code for causing the at least one computer to select a measurement type for measuring the signals based at least in part on the change in location.

Moreover, in an aspect, an apparatus for measuring neighboring cells in wireless communications is provided that includes a signal measuring component for determining to measure signals from one or more neighboring cells and a location change determining component for determining a change in location since a previous measurement. The apparatus further includes a measurement type selecting component for selecting a measurement type for measuring the signals based at least in part on the change in location.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
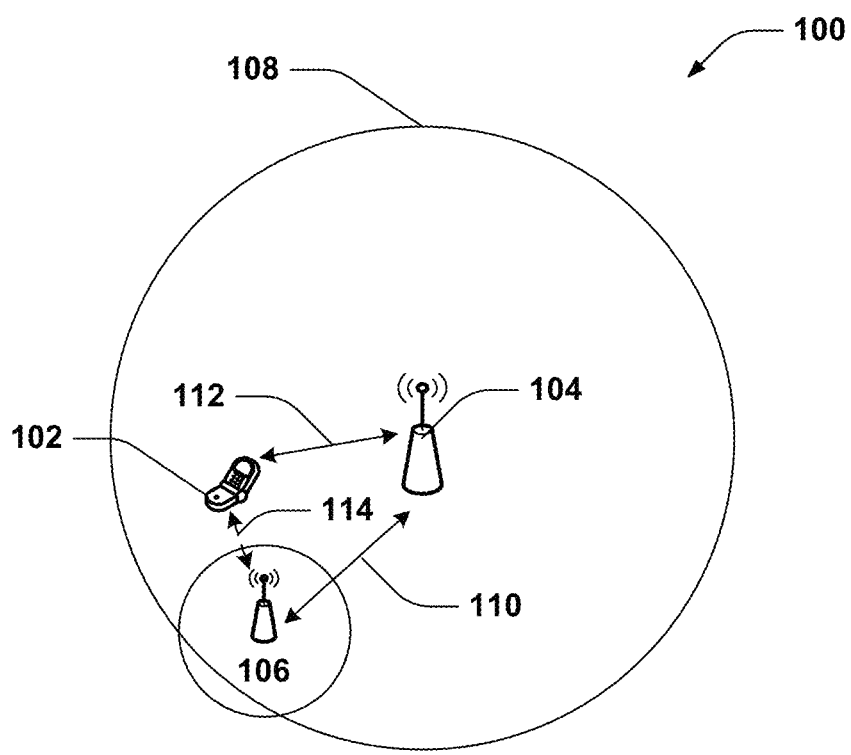
FIG. 1 is a block diagram of an aspect of a system for measuring base stations for cell reselection.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described further herein are various considerations related to a device determining measurements to utilize in generating a signal measurement result for a cell. For example, some resources used by a base station to transmit signals in a cell can be interfered with by signals transmitted from another base station (and/or devices communicating with the base station can interfere with devices communicating with the other base station and vice versa). The base stations can implement a resource partitioning scheme, such as enhanced inter-cell interference cancellation (eICIC), to avoid signals interfering with each other by negotiating allocations of radio resources (e.g., uplink and/or downlink resources). Thus, a device communicating in the cell can be assigned such protected radio resources, and be subject to reduced interference from one or more other cells, devices communicating with the other cells, etc. When measuring cells for reselection or initial cell selection, however, the device may blindly measure signals in the cell without knowledge of the interference, but this measurement may not accurately represent the interference the device may experience when communicating in the cell, since the corresponding base station implements resource partitioning.

Thus, in one example, the device can detect at least a disparity in measurements obtained for a cell. For example, the device can determine that a set of one or more measurements satisfy or are at least near a high quality threshold, while at least another set of the one or more measurements satisfy or are at least near a low quality threshold. The low quality threshold can correspond to a lower signal measurement quality than the high quality threshold such to indicate substantial interference over related resources. In this example, the device can compute a measurement value for the cell (e.g., for idle-mode reselection) based on the set of measurements that are at least at the high quality threshold. The other set of measurements under the low quality threshold can be ignored or otherwise diminished. In this regard, though some measurements of the cell may exhibit substantial interference, a measurement value can be improved by removing the interfered measurements, which can result in a higher ranking of the cell for reselection. In addition, the device can determine resources over which the high quality measurements were performed, and can utilize similar resources in subsequent time periods to measure the cell and/or other cells, since the same resources may have been negotiated as part of resource partitioning in the subsequent time period.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an example system 100 for measuring signals from base stations for reselection. System 100 can include a device 102 that can communicate with base station 104 within a cell 108 provided by the base station 104 to access a wireless network. System 100 also includes a base station 106 that provides wireless network access at least partially within cell 108. For example, device 102 can be a UE, modem (or other tethered device), a portion thereof, and/or the like. Base stations 104 and 106 can each be macrocell base station, femto node, pico node, micro node, or similar base station, a mobile base station, a relay node, a UE (e.g., communicating in peer-to-peer mode with device 102), a portion thereof, and/or the like. In one example, base station 106 can be a femto node or similar base station deployed in cell 108 provided by base station 104, which may include a macrocell base station. Thus, base station 106—and/or devices communicating therewith—can cause interference to base station 104 and/or device 102. In this regard, for example, base stations 104 and 106 can coordinate protected resources (e.g., over a backhaul connection 110) over which the base stations can separately communicate without interfering with each other. For example, allocation of the protected resources can be negotiated using one or more resource partitioning schemes, such as eICIC.

According to an example, device 102 can operate in an idle-mode where the device 102 can reduce or remove power to a transceiver for at least a portion of time to conserve power. In idle-mode, for example, device 102 can receive paging signals from a serving base station, such as base station 104, which can specify whether the device 102 is to switch to an active-mode to receive signals from a wireless network. Operating in idle-mode to receive such paging signals can be referred to as camping; thus, in this example, device 102 can camp on base station 104. In addition, device 102 can perform idle-mode reselection among cells or related base stations to allow the device to continue receiving paging signals, and thus maintain a network connection, while moving throughout different coverage areas. In this example, device 102 can periodically measure signals 112 in the serving cell 108 as well as signals 114 from one or more neighboring cells. For example, the measurements can comprise signal-to-noise ratio (SNR), carrier-to-interference-and-noise ratio (CINR), received signal strength indicator (RSSI), reference signal received power (RSRP), reference signal received quality (RSRQ), and/or similar measurements.

Based in part on the measurement values, for example, the device 102 can determine whether to handover communications to a target base station. For example, where a signal quality reported for the target base station is at least at a threshold difference from that of base station 104, device 102 can initiate idle-mode reselection to the target base station or a cell thereof. In addition, in an example, certain base stations can implement restricted association such as to allow member devices to communicate therewith while denying communication requests from non-member devices. In this regard, where device 102 determines a base station implements restricted association and the device 102 is not a member, device 102 can omit the base station from consideration for reselection (e.g., and can thus not measure the base station), and/or can otherwise avoid or fail in handing over communications thereto. Base station 106, for example, can be a femto node that implements restricted association (e.g., closed subscriber group (CSG)) of which device 102 is a non-member.

In this example, as device 102 moves closer to base station 106 and is not able to handover thereto, communications with base station 104 can be impacted. For example, measurements of signals 112 from base station 104 can degrade as device 102 continues to move closer to base station 106 until device 102 no longer considers base station 104 as a serving cell due to poor quality of signal 112. In this example, the device 102 can enter a limited service state. Where base stations 104 and 106 negotiate allocation of the protected resources using resource partitioning, however, interference from base station 106 may not be experienced by device 102 if device 102 is able to communicate with base station 104, since base station 104 can assign protected resources to device 102 to avoid or at least reduce such interference. Thus, the measurements of signals 112 from base station 104 over resources that are interfered by base station 106 may not be an accurate representation of communication quality at base station 106.

Thus, device 102 can determine to utilize a portion of received measurements and/or can determine to measure signals 112 over a portion of resources to determine a measurement value of base station 104. In one example, device 102 can detect that a portion of received measurements of signals 112 over a set of resources are interfered by one or more base stations while another portion of the received measurements are not substantially interfered. Where measurements of signals from base station 104 over a set of resources include some measurements near or exceeding a high quality threshold while including other measurements that are near or below a low quality threshold, this can indicate that the measurements near or below the low quality threshold are interfered. Thus, the device 102 can generate a measurement value for base station 104 (e.g., and/or provided cell 108) based on the measurements near or exceeding the high quality threshold while avoiding or otherwise diminishing measurements near or below the low quality threshold.

In another example, device 102 can obtain an indication of a set of resources not interfered with by base station 106 over which to perform measurements of base station 104. For example, the indication of the set of resources can be received from one or more network components, e.g., base station 104, and/or base station 106. Moreover, for example, device 102 can determine the set of resources to be similar to resources of a previous measurement of base station 104 determined to be of high quality, as described above. In other examples, device 102 can determine the set of resources based in part on resources over which paging signals are received from base station 104 or other base stations, resources from a previous resource assignment from base station 104 or other base stations, and/or the like. In any case, device 102 can compute a measurement value of signal transmitted by base station 104 for cell reselection or other purposes based on measurements over the resources not subject to interference from base station 106, which may raise a rank of base station 104 for reselection. In the example described above where device 102 moves close enough to base station 104 to operate in a limited service state, this situation can be avoided due to the raised measurement value for base station 104.

Figure 2:
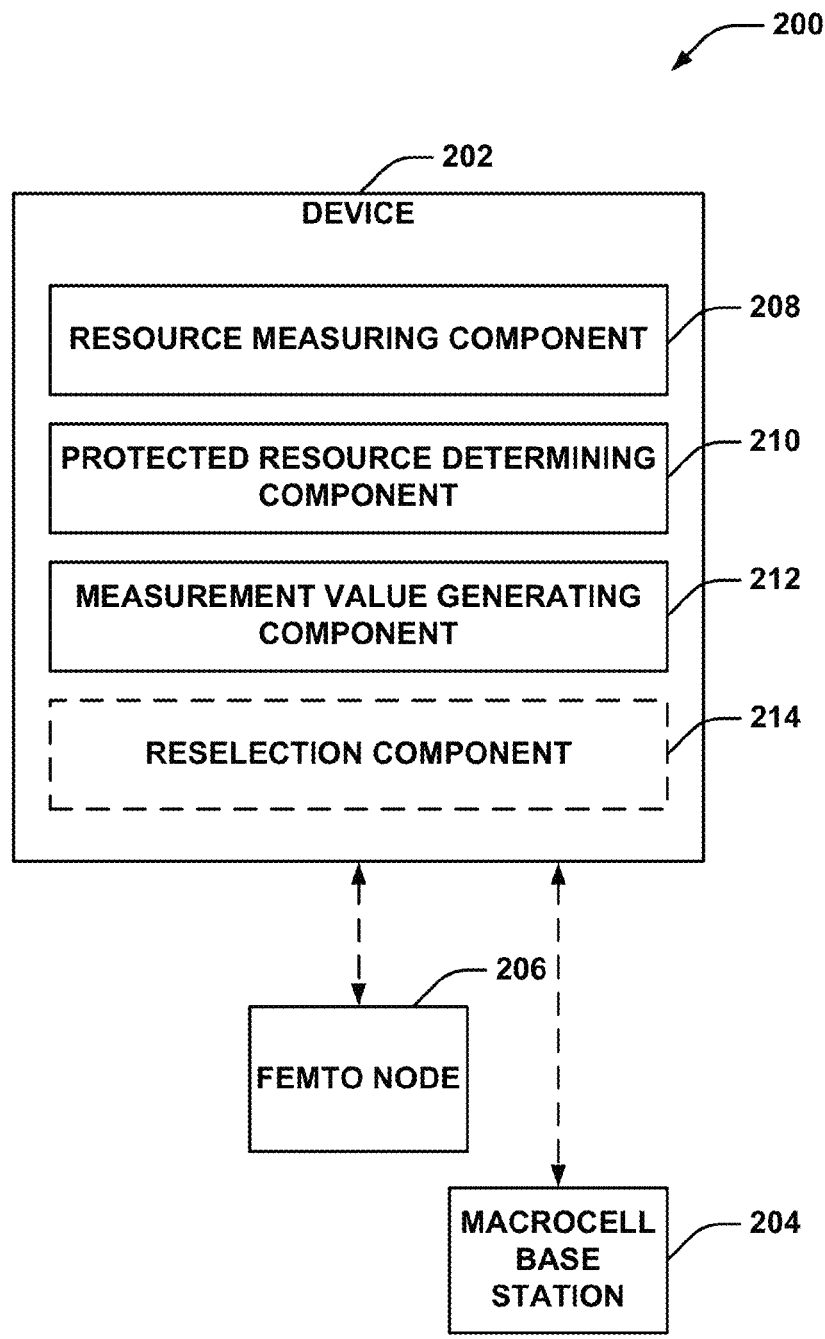
FIG. 2 is a block diagram of an aspect of a system for generating a measurement value for a base station based on measuring a set of protected resources.

FIG. 2 illustrates an example system 200 that measures cells for reselection. System 200 includes a device 202, which as described can communicate with one or more base stations for accessing a wireless network. In addition, system 200 includes a macrocell base station 204 and femto node 206, which can provide wireless network access to one or more devices. Device 202 includes a resource measuring component 208 that performs measurements of one or more base stations for reselection, a protected resource determining component 210 that can detect protected resources at one or more of the base stations, and a measurement value generating component 212 that formulates a measurement value for received signals from the one or more base stations based on measurements over the protected resources. Device 202 can also optionally include a reselection component 214 for performing one or more cell reselection procedures based in part on characteristics of the received signals.

According to an example, device 202 can be camped on macrocell base station 204 in idle-mode (e.g., receiving paging signals from macrocell base station 204 while not having resources explicitly assigned from the macrocell base station 204). Thus, in one example, macrocell base station 204 can be a serving base station that provides a serving cell within which device 202 communicates. In an example, resource measuring component 208 can measure signals from macrocell base station 204, femto node 206, and/or other neighboring base stations for determining whether to perform idle-mode reselection to a neighboring base station.

In addition, as described, femto node 206 can provide a cell at least partially within the serving cell. The femto node 206 can implement a CSG that allows access to a set of member devices in the cell, from which device 202 is excluded in this example. Thus, as device 202 moves closer to femto node 206, femto node 206 can interfere with macrocell base station 204 signals as received at the device 202. As described, however, macrocell base station 204 and femto node 206 can negotiate allocation of a set of protected resources over which femto node 206 refrains from communicating or at least lowers a transmit power, and/or vice versa. The set of protected resources, allocation of which can be negotiated using a resource partitioning scheme, such as eICIC, are thus protected from interference (e.g., in the time domain). Device 202 can measure signals from macrocell base station 204 based on whether the macrocell base station 204 implements resource partitioning with one or more other base stations, such as femto node 206.

In one example, protected resource determining component 210 can infer whether macrocell base station 204 has protected resources at least in part by measuring signals from macrocell base station 204 over multiple time periods and determining whether there is a disparity in the measurements. For example, device 202, macrocell base station 204, and femto node 206 can communicate over time/frequency resources defined by a set of symbols in a time domain, where a number of symbols can comprise a subframe, a number of subframes can comprise a frame, etc. In this example, the protected resources can correspond to at least a portion of symbols in a given subframe. Thus, for example, protected resource determining component 210 can measure the signals from macrocell base station 204 over the symbols in a subframe, and can determine that signals over some symbols have a signal quality near, at, or above a high quality threshold while some have a signal quality near, at, or below a low quality threshold. The symbols having signal quality related to the high quality threshold can correspond to symbols used by macrocell base station 204 in resource partitioning, and the symbols related to the low signal quality can correspond to symbols used by other base stations in resource partitioning, such as femto node 206.

It is to be appreciated that the symbols can correspond to orthogonal frequency division multiplexing (OFDM), time division multiplexing (TDM), and/or similar symbols, and the signal measurements can be SNR, CINR, RSSI, RSRP, RSRQ, or similar measurements. In addition, protected resource determining component 210 can receive the high quality and/or low quality thresholds from a network component or base station, such as macrocell base station 204, a hardcoding, a configuration, etc. Protected resource determining component 210 can additionally or alternatively determine the thresholds based in part on the measurements or previous measurements of macrocell base station 204 and/or other base stations. For example, protected resource determining component 210 can determine whether measurements of macrocell base station 204 are outside a threshold difference (e.g., which can be received, configured, or otherwise determined based on previous differences). In one example, the difference can be based on one or more statistical criteria over the measurements, such as a number of standard deviations.

For example, upon receiving a first and second measurement (e.g., over first and second symbols), protected resource determining component 210 can determine whether the measurements are similar or outside of the threshold difference and can group the measurements based on the determination (e.g., in a similar group where the measurements are similar, or in different groups where the measurements are outside of the threshold difference). Given a next measurement, protected resource determining component 210 can similarly compare the next measurement to the first and/or second measurements to determine whether the next measurement is similar to the first and/or second measurements. For example, where the first and second measurements are determined to be of different quality, protected resource determining component 210 can select a group for the next measurement based on whether the next measurement is closer to the first measurement or the second measurement. Protected resource determining component 210 can continue such comparisons for measurements received in a given time period (e.g., a subframe) detecting disparity in the measurements.

In one example, protected resource determining component 210 can infer that macrocell base station 204 has protected resources based at least in part on additional factors, such as a timing pattern of differing measurement results. In this example, the protected resource determining component 210 determines that measurements over various symbols are close to measurements of a first group or second group, as described above, and accordingly assigns the measurements to a respective group. Such disparity in measurement over the time periods can indicate that the macrocell base station 204 utilizes protected resources. Protected resource determining component 210 can thus detect a repeating pattern of high and low quality measurements over the timing pattern.

Protected resource determining component 210 can specify the protected resources and/or measurements performed thereover to measurement value generating component 212. Measurement value generating component 212 can compute a measurement value for macrocell base station 204 based on measurements over the protected resources. For example, the measurement value can be an average of the measurements and/or the like, and can thus exclude measurements over non-protected resources (e.g., measurements over resources determined to have low signal quality). Reselection component 214, in an example, can determine whether to perform idle-mode reselection to another base station based in part on the measurement value for the macrocell base station 204 (e.g., and/or other base stations), and/or can perform such reselection.

In addition, for example, once protected resource determining component 210 determines the protected resources (e.g., by measuring signal quality and inferring the resources, receiving an indication of the resources, and/or the like) resource measuring component 208 can perform subsequent resource measurements for macrocell base station 204 (e.g., and/or one or more other base stations) over the inferred protected resource locations in a subsequent time period (e.g., a subframe).

In another example, protected resource determining component 210 can determine symbols over which paging signals are received from macrocell base station 204 and can determine such symbols as protected. In this example, the macrocell base station 204 can transmit paging signals for idle-mode devices over protected resources to mitigate interference from femto node 206 or other base stations.

In yet another example, protected resource determining component 210 can determine the symbols based on previous communications with macrocell base station 204. For example, device 202 can have previously communicated in active-mode with the macrocell base station 204, or another base station, and can have received an assignment of protected resources therefrom. In this example, protected resource determining component 210 can determine to measure signals from macrocell base station 204 in symbol periods related to the previous resource assignment within one or more subframes for the purpose of idle-mode reselection.

In addition, protected resource determining component 210 can determine to detect protected resources at macrocell base station 204 based at least in part on one or more triggering criteria. For example, protected resource determining component 210 can determine that signal quality of macrocell base station 204 is degrading as a triggering criterion (e.g., based on comparing previous measurements, determining that a measurement is below a threshold, etc.). In addition, protected resource determining component 210 can determine that macrocell base station 204 utilizes resource partitioning, as described above, as an additional or alternative triggering criterion. In other examples, the determination that the macrocell base station 204 uses resources partitioning can be received as an explicit indication from one or more network components, configuration values, and/or the like.

Moreover, for example, protected resource determining component 210 can determine that a strong neighboring cell (e.g., femto node 206) cannot provide services to device 202 as an additional or alternative triggering criterion. For example, this can include determining femto node 206 operates in a restricted access mode (e.g., as part of a CSG). In this example, the femto node 206 can broadcast a restricted access mode identification (e.g., a CSG identifier), and the device 202 can compare the identification to a list of allowed femto nodes to determine whether device 202 can access femto node 206. In addition, this can include determining one or more conditions of a measured signal from femto node 206 in conjunction with determining the restricted access, such as a quality over a threshold level, a ranking of femto node 206 over macrocell base station 204 for cell reselection, and/or the like, such that the condition relates to the inability to receive service from a cell with at least a threshold difference in signal quality as a serving cell. In yet another example, determining that the strong neighboring cell cannot provide services can be based in part on other signal parameters indicating the strong neighboring cell is not available for accessing a wireless network, such as a closed access mode indicator, an indicator of a type of cell and/or related traffic, a subscription identifier related to data for which a certain subscription may be required, a failed access attempt, and/or the like. When the one or more triggering criteria are satisfied, for example, protected resource determining component 210 can determine the protected resources for reporting and/or performing measurements, as described above.

Figure 3:
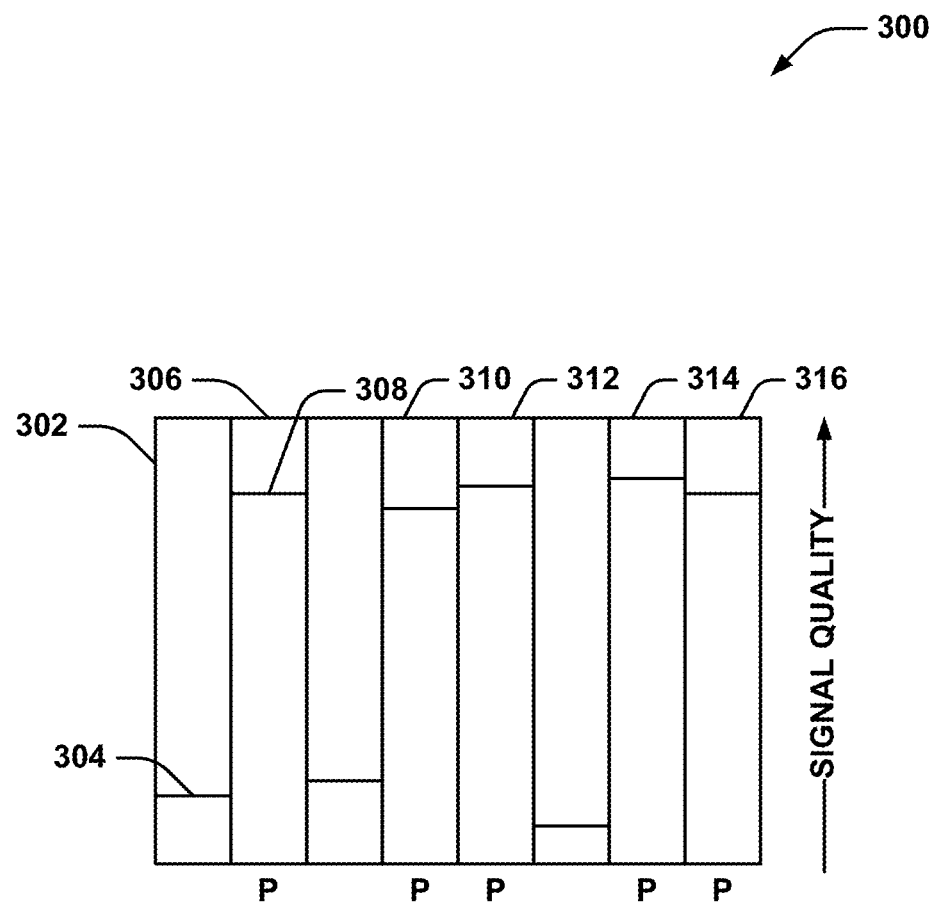
FIG. 3 is an illustration of example signal measurements over a set of resources in a time-domain.

FIG. 3 shows example measurement results 300 over a collection of resources. In one example, the resources can correspond to eight symbols in a subframe, and eight measurement results, such as result 302, are shown. For example, the resources can include measurements determined to correspond to protected symbols (e.g., marked "P") and measurements determined to correspond to unprotected symbols. For example, in result 302, which correlates to a measurement of an unprotected symbol, a device can measure signals from a base station at a low signal quality, as indicated at 304. In symbol 306, a measurement over a next symbol (e.g., which can correspond to a next time period in TDM, OFDM, etc) correlates to a protected symbol since the measurement performed by a device is at a high signal quality, as indicated at 308, and so on. The device can detect such a bimodal disparity in the measurements. It is to be appreciated, however, that additional levels of disparity can similarly be detected that relate to additional functionality with respect to the measurements (e.g., detecting a medium signal quality and determining a separate measurement value, applying a medium weight to the signal quality for determining the measurement value, etc.).

For example, the device can determine which measurements over symbols have a quality at or near a high quality threshold, such as measurement 308 as described, and can consider those symbols as protected. In another example, the device can determine that a subset of the signal quality measurements, such as measurement 308, are at least at or near a threshold difference from at least one of a subset of other signal quality measurements, such as measurement 304 as described. Upon determining protected symbols, the device can utilize measurements over the protected symbols for determining a measurement value for the base station (e.g., as an average or other combination of the measurements). In another example, the device can use the measurements to determine protected symbols for measurement in subsequent subframes (e.g., for the base station or other base stations). In the depicted example, in the eight measurements shown for eight corresponding symbols in a subframe, symbol 2 306, symbol 4 310, symbol 5 312, symbol 7 314, and symbol 8 316 can be determined to be protected due to having high signal quality measurements. Thus, the device can measure over these symbols in a subsequent subframe without performing measurements in remaining symbols of the subframe to determine a subsequent measurement value for the base station.

Figure 4:
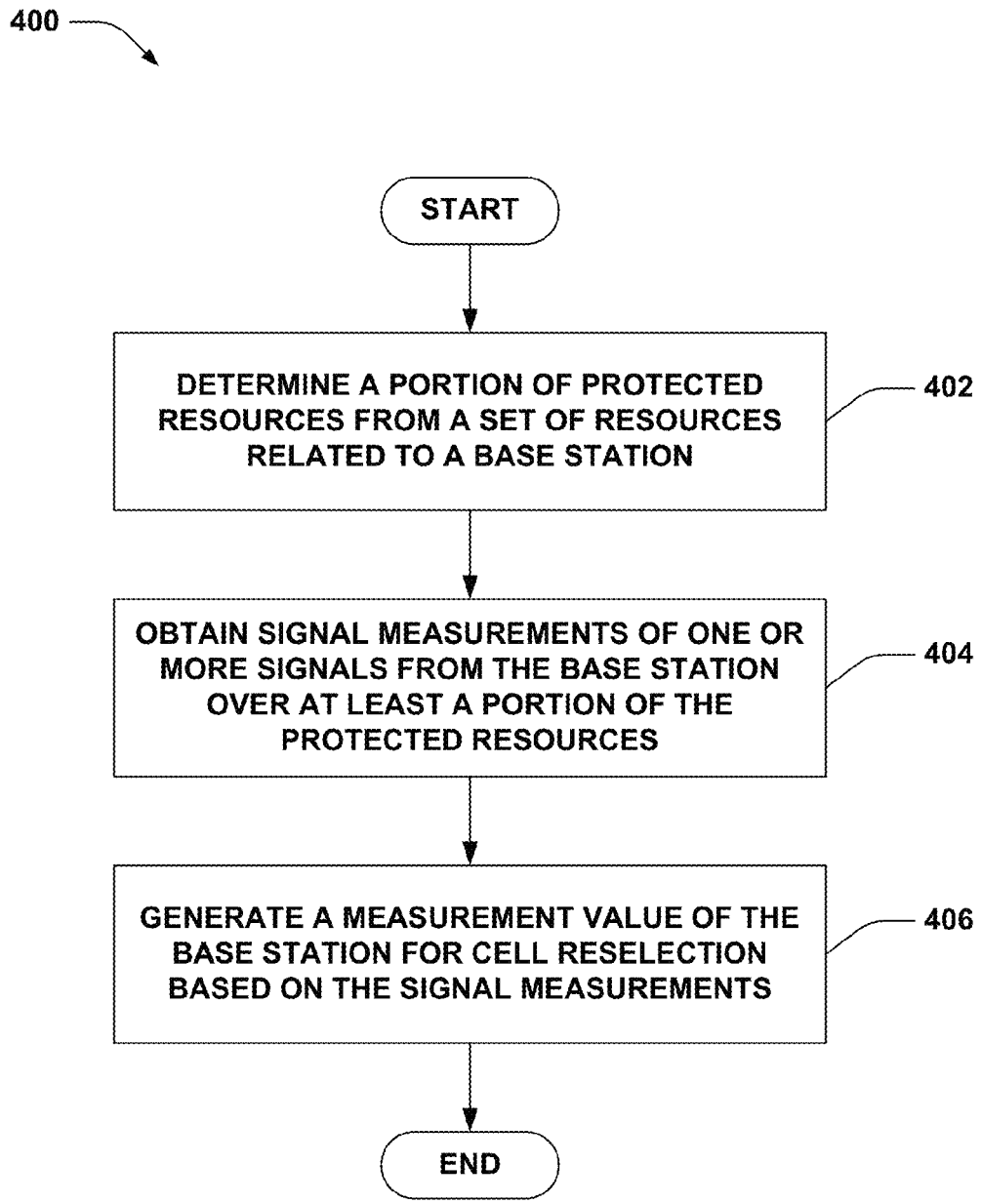
FIG. 4 is a flow chart of an aspect of a methodology for generating a measurement value for a base station.
Figure 5:
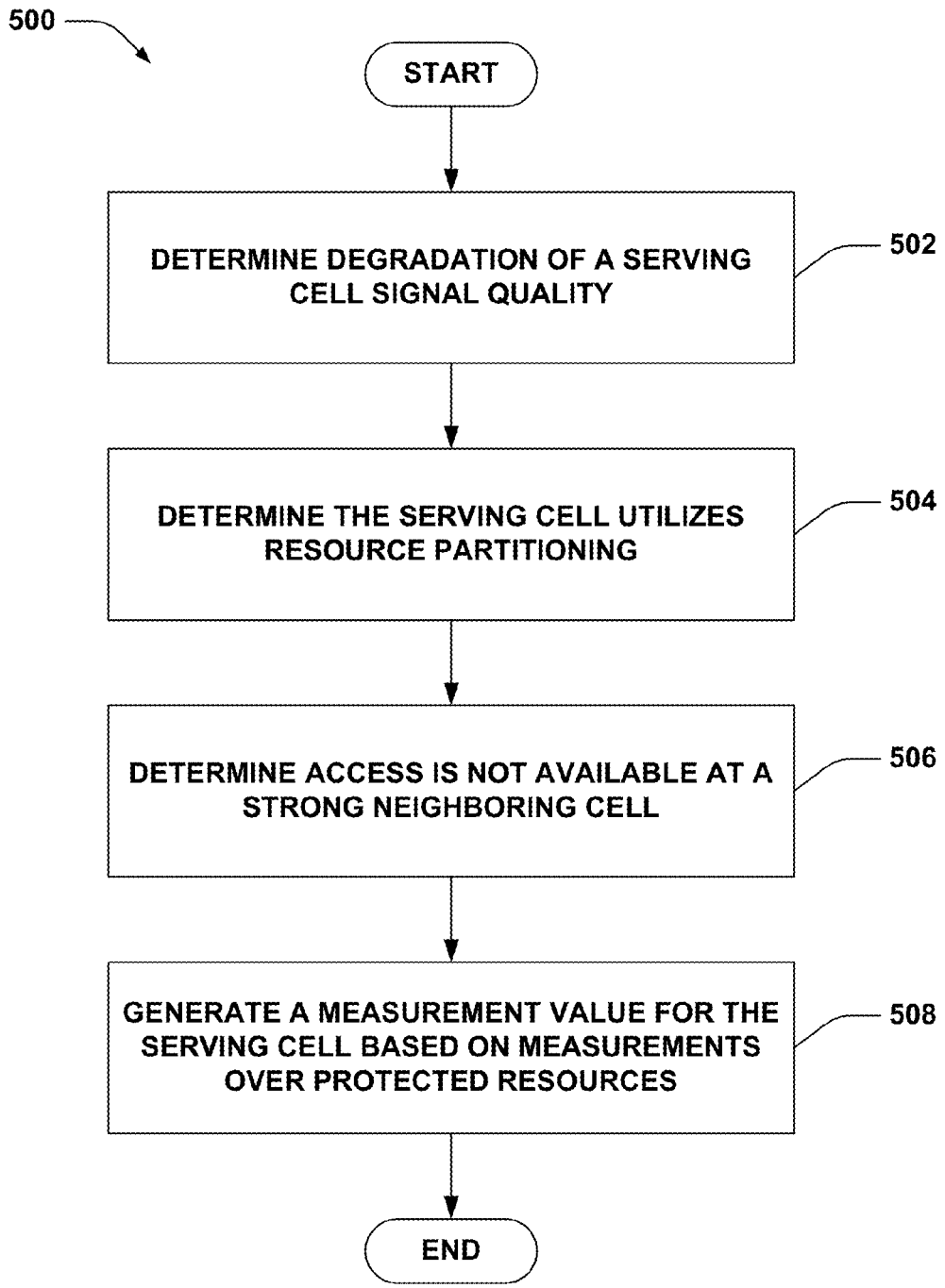
FIG. 5 is a flow chart of an aspect of a methodology for measuring signals of a base station according to a plurality of determinations.

FIGS. 4-5 illustrate example methodologies relating to generating measurement values for base stations. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 4 depicts an example methodology 400 for generating a measurement value for a base station. At 402, a portion of protected resources can be determined from a set of resources related to a base station. For example, this can include inferring the protected resources from the set of resources based on measurements received over the set of resources (e.g., detecting at least a bimodal disparity in the measurements, as described). In other examples, this can include receiving an indication of the protected resources, determining the protected resources based on a resource assignment received from the base station, assuming resources over which paging signals are transmitted by the base station to be protected resources, and/or the like.

At 404, signal measurements of one or more signals from the base station can be obtained over at least a portion of the protected resources. In one example, the signal measurements can be obtained over the protected resources where the protected resources are determined before obtaining the signal measurements. In another example, the signal measurements can be obtained over the set of resources, and protected resources can be obtained based on the measurements, as described. This can include detecting at least a bimodal disparity in the measurements, such as detecting measurements near, at, or exceeding a high quality threshold along with measurements near, at, or below a low quality threshold. The measurements related to the high quality threshold can correspond to protected resources.

At 406, a measurement value of the base station can be generated for cell resection based on the signal measurements. For example, the measurement value can be computed as an average or other function of the signal measurements. The measurement value can be utilized in determining whether to perform cell reselection, for example. Thus, though a device can communicate in an idle-mode, the device can measure a serving cell over protected resources to evaluate the serving cell for reselection. This allows the device to determine potential radio conditions at the serving cell when protected resources are assigned thereto.

FIG. 5 illustrates an example methodology 500 for generating a measurement value for a serving cell. At 502, degradation of a serving cell signal quality can be determined. For example, this can be based on measuring signals from a base station that provides the serving cell and comparing the measurements to previous measurements thereof.

At 504, it can be determined that the serving cell utilizes resource partitioning. For example, this can be based on measuring signals over a set of resources and determining at least a bimodal disparity, receiving an indication of such, determining based on a previously received resource assignment, and/or the like.

At 506, it can be determined that access at a strong neighboring cell is not available. For example, the strong neighboring cell can be a cell for which a highest signal quality is measured as compared to other neighboring cells and/or a serving cell. The determination that access is not available can be based in part on determining the strong neighboring cell is associated with a CSG for which membership is not available. As described, this can include comparing a CSG identifier broadcast by the strong neighboring cell to a list of allowed or non-allowed CSGs. In another example, the determination that access is not available can be based on other signal parameters indicating the strong neighboring cell is not available for accessing a wireless network, such as a closed access mode indicator, an indicator of a type of cell and/or related traffic, a subscription identifier related to data for which a certain subscription may be required, a failed access attempt, and/or the like.

At 508, a measurement value can be generated for the serving cell based on measurements over protected resources. As described, this can include determining the protected resources from a set of resources, and performing or otherwise utilizing measurements over the protected resources for generating the measurement value. Thus, the serving cell can be evaluated based on the protected resources without considering resources over which the strong neighboring cell interferes with the serving cell.

It will be appreciated that, in accordance with one or more aspects described herein, inferences can be made regarding determining protected resources for a base station, determining whether to generate a measurement value for a base station using measurements over protected resources, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
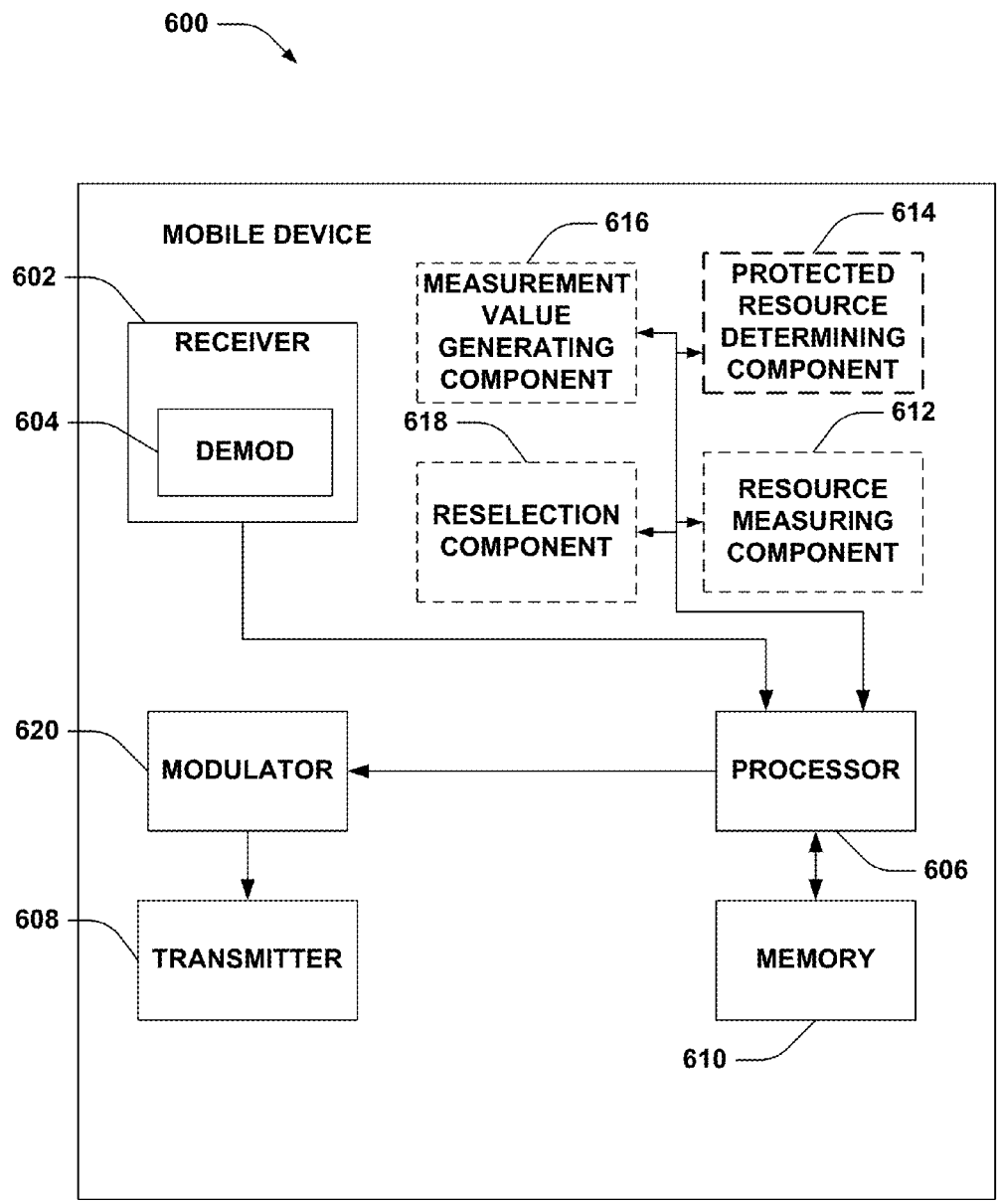
FIG. 6 is a block diagram of a system in accordance with aspects described herein.

FIG. 6 is an illustration of a mobile device 600 that can communicate in a wireless network. Mobile device 600 comprises a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 608, a processor that controls one or more components of mobile device 600, and/or a processor that both analyzes information received by receiver 602, generates information for transmission by transmitter 608, and controls one or more components of mobile device 600.

Mobile device 600 can additionally comprise memory 610 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 610 can additionally store protocols and/or algorithms associated with estimating and/or utilizing a channel (e.g., performance based, capacity based, etc.), measuring over and/or determining protected resources of a base station, etc.

It will be appreciated that the data store (e.g., memory 610) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 610 of the subject systems and methods is intended to comprise, without being limited to, these and any other suitable types of memory.

Processor 606 can further be optionally operatively coupled to a resource measuring component 612, which can be similar to resource measuring component 208, a protected resource determining component 614, which can be similar to protected resource determining component 210, a measurement value generating component 616, which can be similar to measurement value generating component 212, and/or a reselection component 618, which can be similar to reselection component 214.

Mobile device 600 still further comprises a modulator 620 that modulates signals for transmission by transmitter 608 to, for instance, a base station, another mobile device, etc. Moreover, for example, mobile device 600 can comprise multiple transmitters 608 for multiple network interfaces, as described. Although depicted as being separate from the processor 606, it is to be appreciated that the demodulator 604, resource measuring component 612, protected resource determining component 614, measurement value generating component 616, reselection component 618, and/or modulator 620 can be part of the processor 606 or multiple processors (not shown), and/or stored as instructions in memory 610 for execution by processor 606.

Figure 7:
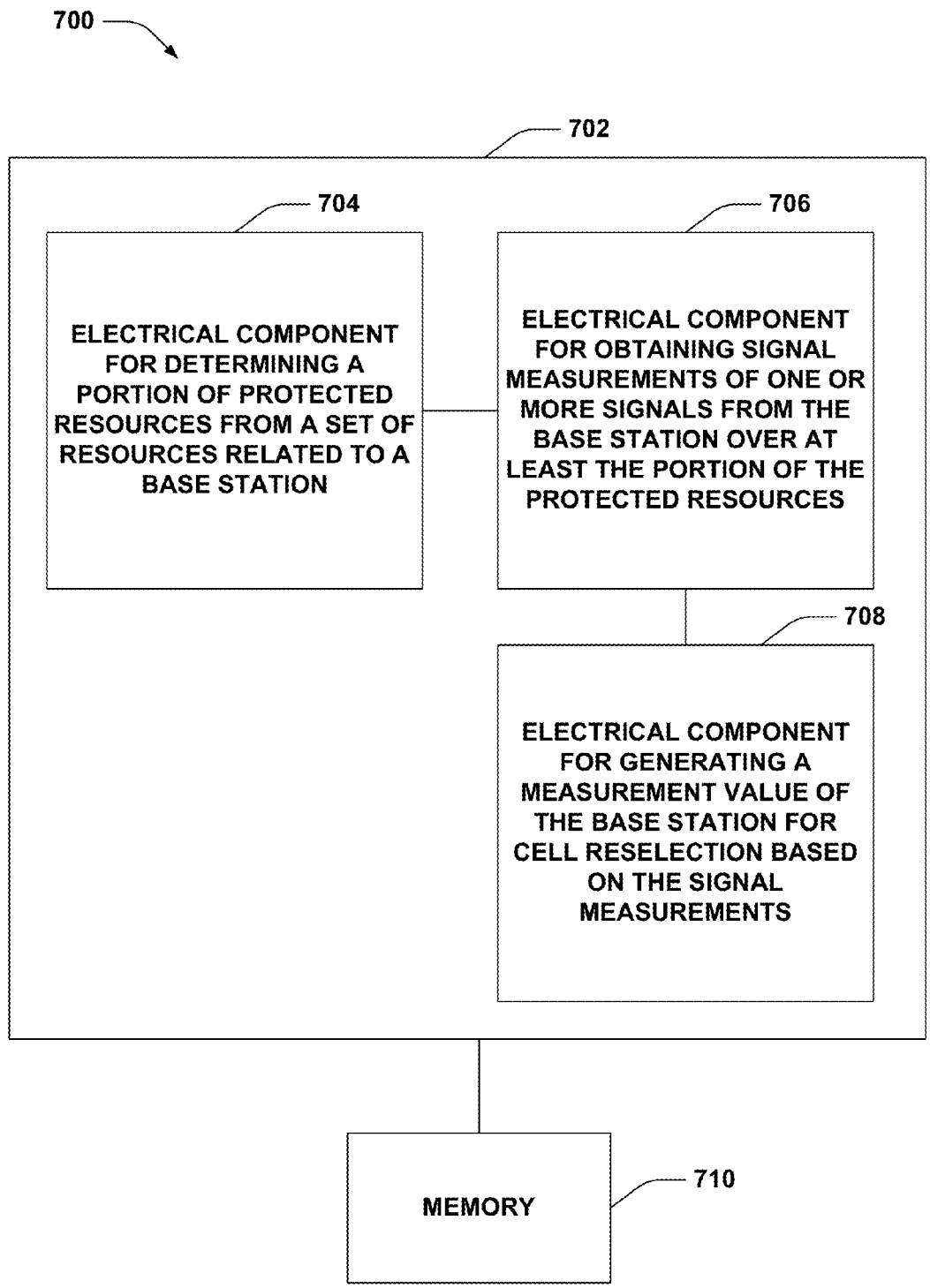
FIG. 7 is a block diagram of an aspect of a system that generates a measurement value for a base station.

FIG. 7 illustrates a system 700 for generating a measurement value for a base station. For example, system 700 can reside at least partially within a mobile device or other entity that measures base stations for reselection. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component for determining a portion of protected resources from a set of resources related to a base station 704. As described, the portion of protected resources can be determined based on measuring signals over the set of resources, receiving an indication of protected resources, a previous resource assignment, etc.

Further, logical grouping 702 can comprise an electrical component for obtaining signal measurements of one or more signals from the base station over at least the portion of the protected resources 706. This can include measuring over the portion of protected resources and/or measuring over the set of resources, as described, to determine the portion of protected resources. Logical grouping 702 also comprises an electrical component for generating a measurement value of the base station for cell reselection based on the signal measurements 708. This can improve the signal measurement for the base station since measurements over possibly interfered resources can be ignored. For example, electrical component 704 can include a protected resource determining component 210, as described above. In addition, for example, electrical component 706, in an aspect, can include a resource measuring component 208, as described above, and/or electrical component 708 can include a measurement value generating component 212.

Additionally, system 700 can include a memory 710 that retains instructions for executing functions associated with the electrical components 704, 706, and 708. While shown as being external to memory 710, it is to be understood that one or more of the electrical components 704, 706, and 708 can exist within memory 710. In one example, electrical components 704, 706, and 708 can comprise at least one processor, or each electrical component 704, 706, and 708 can be a corresponding module of at least one processor. Moreover, in an additional or alternative example, electrical components 704, 706, and 708 can be a computer program product comprising a computer readable medium, where each electrical component 704, 706, and 708 can be corresponding code.

Figure 8:
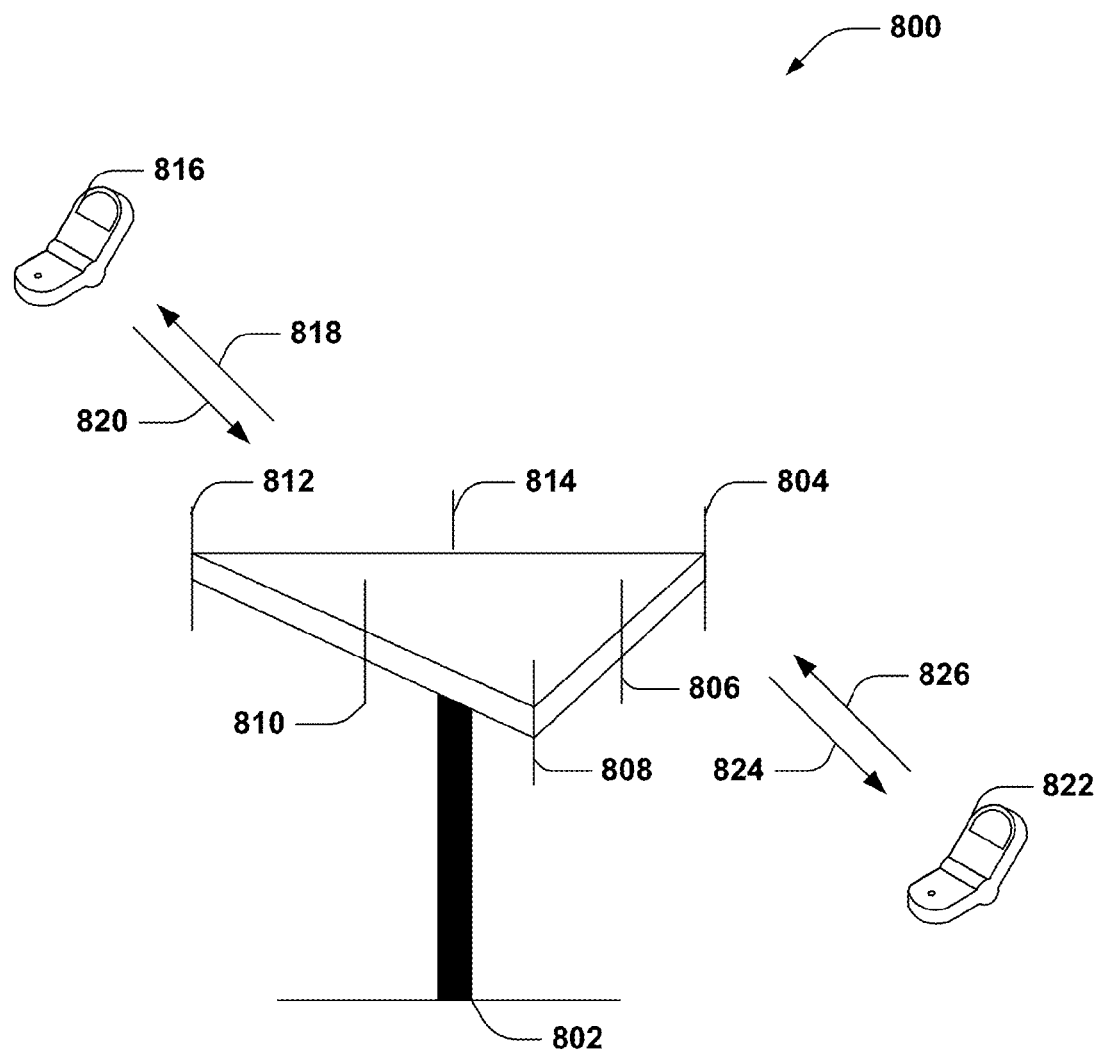
FIG. 8 is a block diagram of an aspect of a wireless communication system in accordance with various aspects set forth herein.

FIG. 8 illustrates a wireless communication system 800 in accordance with various embodiments presented herein. System 800 comprises a base station 802 that can include multiple antenna groups. For example, one antenna group can include antennas 804 and 806, another group can comprise antennas 808 and 810, and an additional group can include antennas 812 and 814. Two antennas are illustrated for each antenna group; however, more or fewer antennas can be utilized for each group. Base station 802 can additionally include a transmitter chain and a receiver chain, each of which can in turn comprise a plurality of components or modules associated with signal transmission and reception (e.g., processors, modulators, multiplexers, demodulators, demultiplexers, antennas, etc.), as is appreciated.

Base station 802 can communicate with one or more mobile devices such as mobile device 816 and mobile device 822; however, it is to be appreciated that base station 802 can communicate with substantially any number of mobile devices similar to mobile devices 816 and 822. Mobile devices 816 and 822 can be, for example, cellular phones, smart phones, laptops, handheld communication devices, handheld computing devices, satellite radios, global positioning systems, PDAs, and/or any other suitable device for communicating over wireless communication system 800. As depicted, mobile device 816 is in communication with antennas 812 and 814, where antennas 812 and 814 transmit information to mobile device 816 over a forward link 818 and receive information from mobile device 816 over a reverse link 820. Moreover, mobile device 822 is in communication with antennas 804 and 806, where antennas 804 and 806 transmit information to mobile device 822 over a forward link 824 and receive information from mobile device 822 over a reverse link 826. In a frequency division duplex (FDD) system, forward link 818 can utilize a different frequency band than that used by reverse link 820, and forward link 824 can employ a different frequency band than that employed by reverse link 826, for example. Further, in a time division duplex (TDD) system, forward link 818 and reverse link 820 can utilize a common frequency band and forward link 824 and reverse link 826 can utilize a common frequency band.

Each group of antennas and/or the area in which they are designated to communicate can be referred to as a sector of base station 802. For example, antenna groups can be designed to communicate to mobile devices in a sector of the areas covered by base station 802. In communication over forward links 818 and 824, the transmitting antennas of base station 802 can utilize beamforming to improve signal-to-noise ratio of forward links 818 and 824 for mobile devices 816 and 822. Also, while base station 802 utilizes beamforming to transmit to mobile devices 816 and 822 scattered randomly through an associated coverage, mobile devices in neighboring cells can be subject to less interference as compared to a base station transmitting through a single antenna to all its mobile devices. Moreover, mobile devices 816 and 822 can communicate directly with one another using a peer-to-peer or ad hoc technology as depicted. According to an example, mobile devices 816 and/or 822 can determine protected resources of base station 802, as described, to measure signals therefrom in idle-mode cell reselection.

Figure 9:
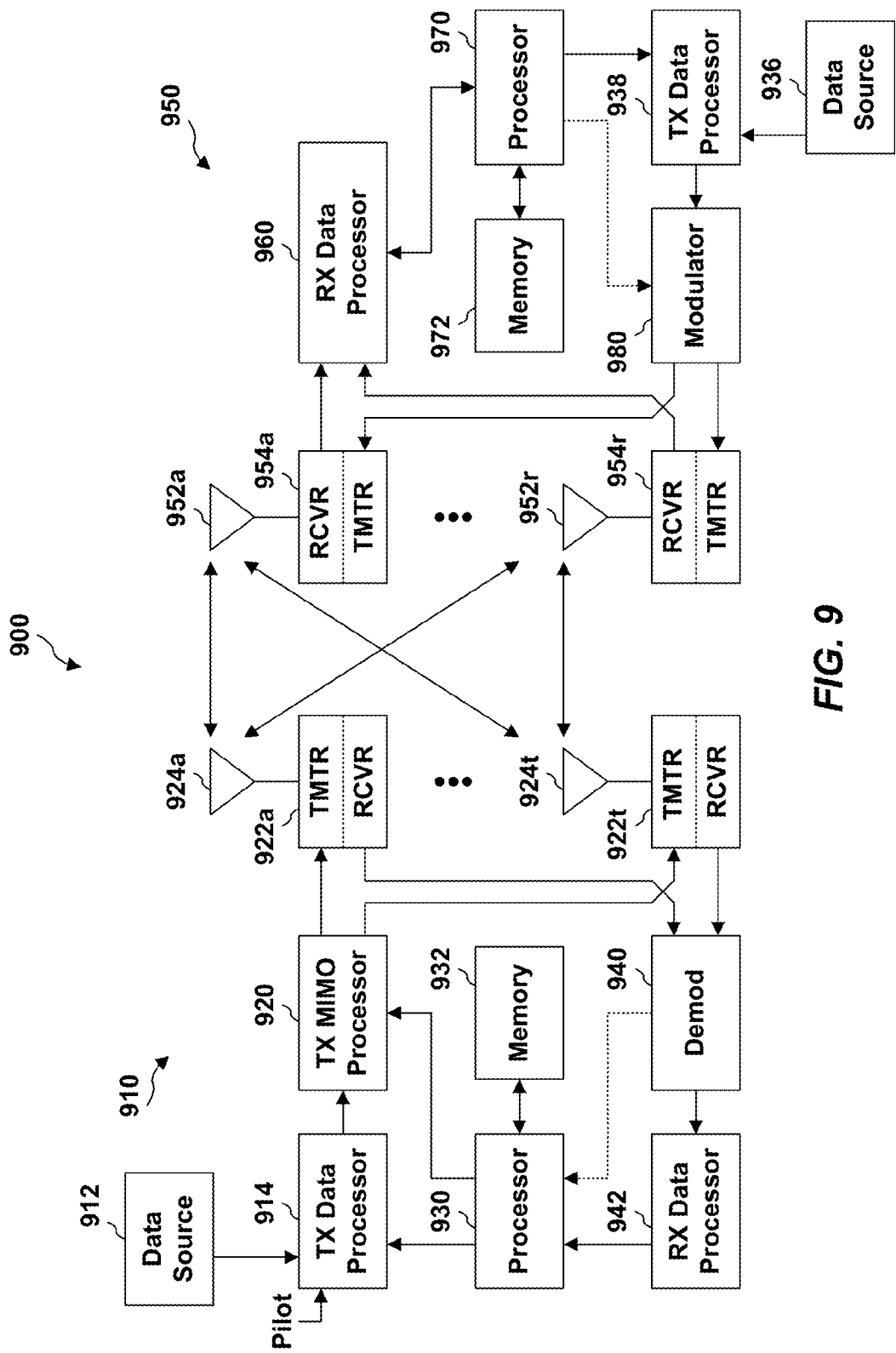
FIG. 9 is a schematic block diagram of an aspect of a wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1, 2, 7, and 8), example signal measurements (FIG. 3), methods (FIGS. 4-5), and/or mobile devices (FIG. 6) described herein to facilitate wireless communication there between. For example, components or functions of the systems and/or methods described herein can be part of a memory 932 and/or 972 or processors 930 and/or 970 described below, and/or can be executed by processors 930 and/or 970 to perform the disclosed functions.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. For example, processor 930 and/or 970 can execute, and/or memory 932 and/or 972 can store instructions related to functions and/or components described herein, such as determining protected resources, measuring signals over the protected resources, generating a measurement value for the base station based on the signal measurements, and/or the like, as described.

Figure 10:
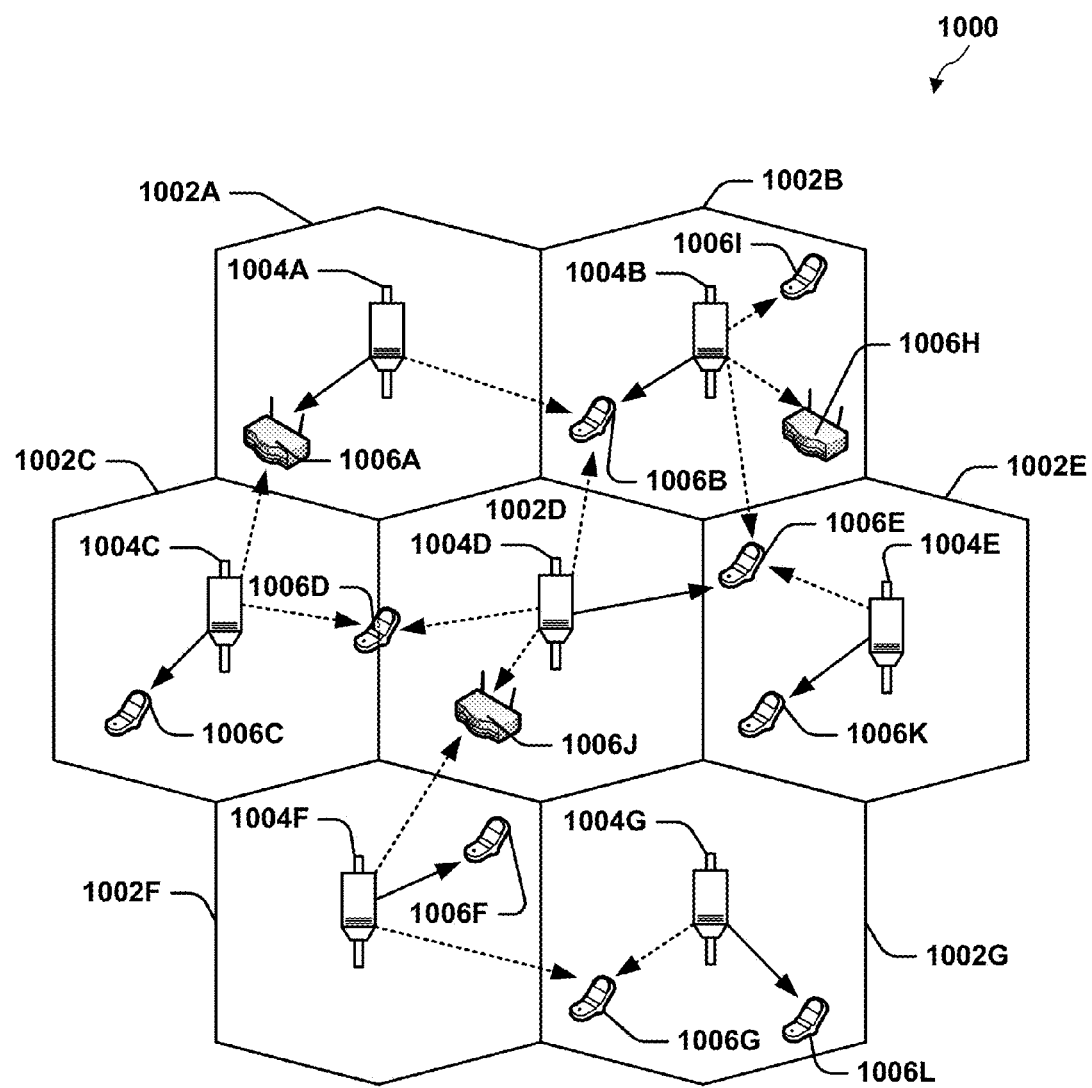
FIG. 10 illustrates an example wireless communication system, configured to support a number of devices, in which the aspects herein can be implemented.

FIG. 10 illustrates a wireless communication system 1000, configured to support a number of users, in which the teachings herein may be implemented. The system 1000 provides communication for multiple cells 1002, such as, for example, macro cells 1002A-1002G, with each cell being serviced by a corresponding access node 1004 (e.g., access nodes 1004A-1004G). As shown in FIG. 10, access terminals 1006 (e.g., access terminals 1006A-1006L) can be dispersed at various locations throughout the system over time. Each access terminal 1006 can communicate with one or more access nodes 1004 on a forward link (FL) and/or a reverse link (RL) at a given moment, depending upon whether the access terminal 1006 is active and whether it is in soft handoff, for example. The wireless communication system 1000 can provide service over a large geographic region.

Figure 11:
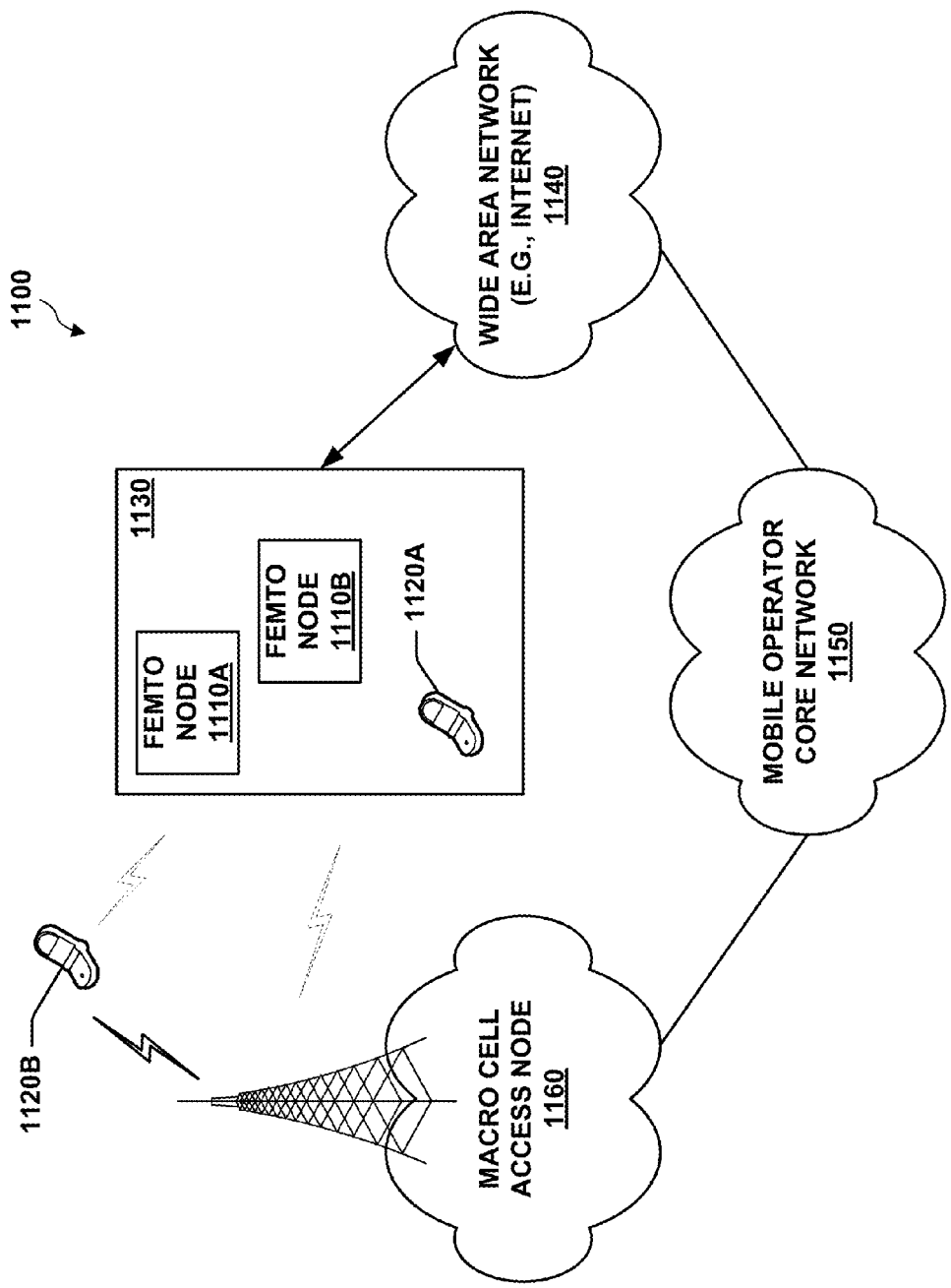
FIG. 11 is an illustration of an exemplary communication system to enable deployment of femtocells within a network environment.

FIG. 11 illustrates an exemplary communication system 1100 where one or more femto nodes are deployed within a network environment. Specifically, the system 1100 includes multiple femto nodes 1110A and 1110B (e.g., femtocell nodes or H(e)NB) installed in a relatively small scale network environment (e.g., in one or more user residences 1130). Each femto node 1110 can be coupled to a wide area network 1140 (e.g., the Internet) and a mobile operator core network 1150 via a digital subscriber line (DSL) router, a cable modem, a wireless link, or other connectivity means (not shown). As will be discussed below, each femto node 1110 can be configured to serve associated access terminals 1120 (e.g., access terminal 1120A) and, optionally, alien access terminals 1120 (e.g., access terminal 1120B). In other words, access to femto nodes 1110 can be restricted such that a given access terminal 1120 can be served by a set of designated (e.g., home) femto node(s) 1110 but may not be served by any non-designated femto nodes 1110 (e.g., a neighbor's femto node).

Figure 12:
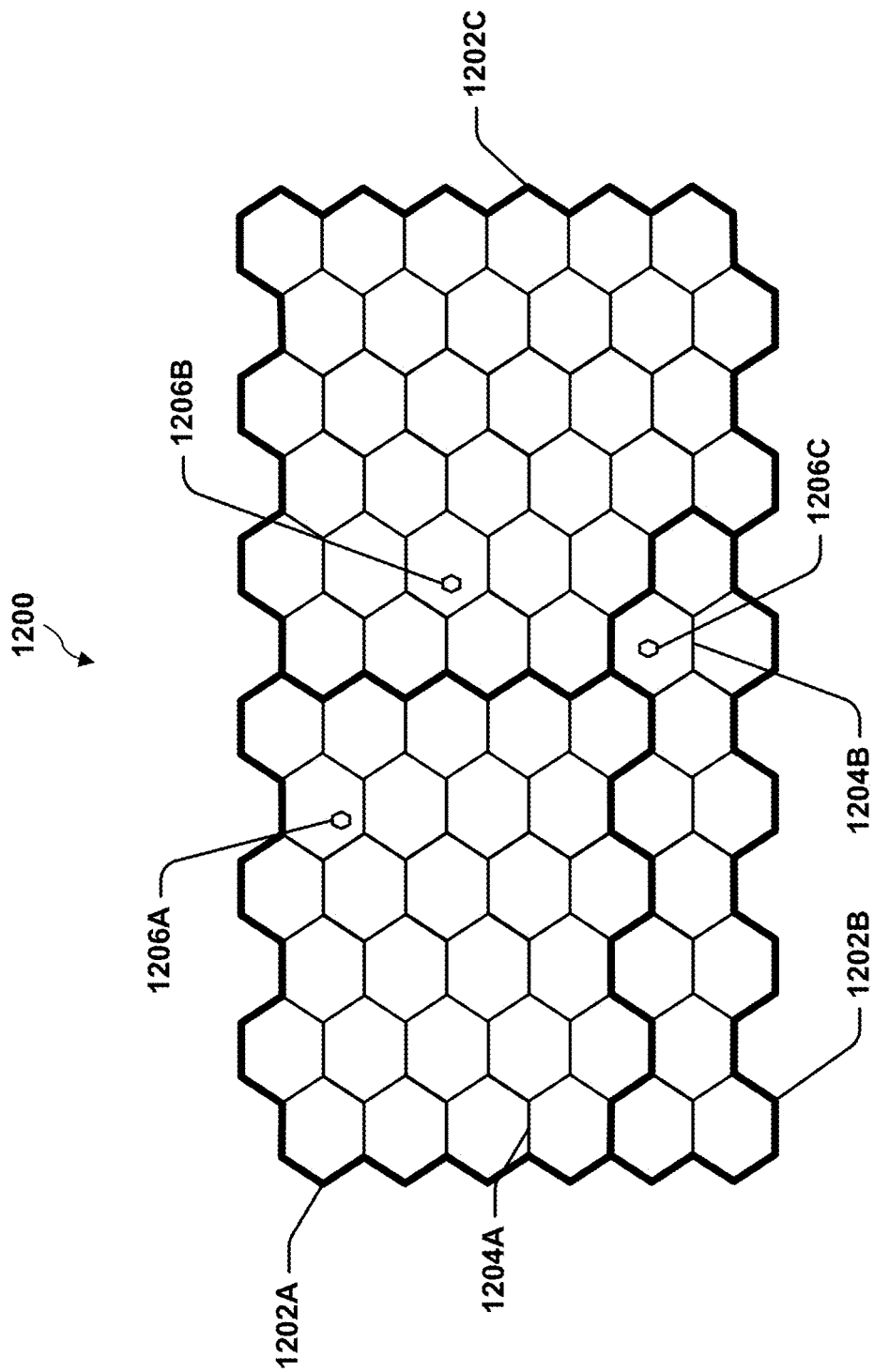
FIG. 12 illustrates an example of a coverage map having several defined tracking areas.

FIG. 12 illustrates an example of a coverage map 1200 where several tracking areas 1202 (or routing areas or location areas) are defined, each of which includes several macro coverage areas 1204. Here, areas of coverage associated with tracking areas 1202A, 1202B, and 1202C are delineated by the wide lines and the macro coverage areas 1204 are represented by the hexagons. The tracking areas 1202 also include femto coverage areas 1206. In this example, each of the femto coverage areas 1206 (e.g., femto coverage area 1206C) is depicted within a macro coverage area 1204 (e.g., macro coverage area 1204B). It should be appreciated, however, that a femto coverage area 1206 may not lie entirely within a macro coverage area 1204. In practice, a large number of femto coverage areas 1206 can be defined with a given tracking area 1202 or macro coverage area 1204. Also, one or more pico coverage areas (not shown) can be defined within a given tracking area 1202 or macro coverage area 1204.

Referring again to FIG. 11, the owner of a femto node 1110 can subscribe to mobile service, such as, for example, 3G mobile service, offered through the mobile operator core network 1150. In addition, an access terminal 1120 can be capable of operating both in macro environments and in smaller scale (e.g., residential) network environments. Thus, for example, depending on the current location of the access terminal 1120, the access terminal 1120 can be served by an access node 1160 or by any one of a set of femto nodes 1110 (e.g., the femto nodes 1110A and 1110B that reside within a corresponding user residence 1130). For example, when a subscriber is outside his home, he is served by a standard macro cell access node (e.g., node 1160) and when the subscriber is at home, he is served by a femto node (e.g., node 1110A). Here, it should be appreciated that a femto node 1110 can be backward compatible with existing access terminals 1120.

A femto node 1110 can be deployed on a single frequency or, in the alternative, on multiple frequencies. Depending on the particular configuration, the single frequency or one or more of the multiple frequencies can overlap with one or more frequencies used by a macro cell access node (e.g., node 1160). In some aspects, an access terminal 1120 can be configured to connect to a preferred femto node (e.g., the home femto node of the access terminal 1120) whenever such connectivity is possible. For example, whenever the access terminal 1120 is within the user's residence 1130, it can communicate with the home femto node 1110.

In some aspects, if the access terminal 1120 operates within the mobile operator core network 1150 but is not residing on its most preferred network (e.g., as defined in a preferred roaming list), the access terminal 1120 can continue to search for the most preferred network (e.g., femto node 1110) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1120 can limit the search for specific band and channel. For example, the search for the most preferred system can be repeated periodically. Upon discovery of a preferred femto node, such as femto node 1110, the access terminal 1120 selects the femto node 1110 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1110 that reside within the corresponding user residence 1130). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on (e.g., the access terminal is a non-member), except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communication, comprising:
   determining a portion of protected resources from a set of resources related to a base station, wherein the portion of protected resources is allocated according to resource partitioning between the base station and one or more other base stations so that the base station can communicate over the portion of protected resources with reduced interference;
   obtaining signal measurements of one or more signals from the base station over at least the portion of protected resources; and
   generating a measurement value of the base station for cell reselection based on the signal measurements.

2. The method of claim 1, wherein the obtaining the signal measurements further comprises obtaining the signal measurements of the one or more signals from the base station over the set of resources, and wherein the determining the portion of protected resources is based in part on the signal measurements over the set of resources.

3. The method of claim 2, wherein the determining the portion of protected resources comprises determining the portion of protected resources corresponding to a portion of the signal measurements over the set of resources that are above a threshold signal quality.

4. The method of claim 2, further comprising utilizing the portion of protected resources in generating a subsequent measurement value of the base station.

5. The method of claim 1, wherein the determining the portion of protected resources includes receiving an indication of the portion of protected resources from the base station.

6. The method of claim 1, wherein the obtaining the signal measurements over at least the portion of protected resources is based in part on the determining the portion of protected resources.

7. The method of claim 6, wherein the obtaining the signal measurements over at least the portion of protected resources is further based in part on determining that a femto node that implements restricted association has a higher signal quality than the base station.

8. The method of claim 7, wherein the obtaining the signal measurements over at least the portion of protected resources is further based in part on determining that a signal quality of the base station is degrading based in part on one or more previous signal measurements.

9. The method of claim 1, wherein the determining the portion of protected resources comprises determining the portion of protected resources as utilized by the base station for transmitting paging signals.

10. The method of claim 1, wherein the determining the portion of protected resources comprises determining the portion of protected resources based on a previous resource assignment from the base station.

11. An apparatus for measuring base station signals, comprising: at least one processor configured to:
   determine a portion of protected resources from a set of resources related to a base station, wherein the portion of protected resources is allocated according to resource partitioning between the base station and one or more other base stations so that the base station can communicate over the portion of protected resources with reduced interference;
   obtain signal measurements of one or more signals from the base station over at least the portion of protected resources; and
   generate a measurement value of the base station for cell reselection based on the signal measurements; and
   a memory coupled to the at least one processor.

12. The apparatus of claim 11, wherein the at least one processor obtains the signal measurements of the one or more signals from the base station over the set of resources, and wherein the at least one processor determines the portion of protected resources based in part on the signal measurements over the set of resources.

13. The apparatus of claim 12, wherein the at least one processor determines the portion of protected resources as corresponding to a portion of the signal measurements over the set of resources that are above a threshold signal quality.

14. The apparatus of claim 12, wherein the at least one processor is further configured to utilize the portion of protected resources in generating a subsequent measurement value of the base station.

15. The apparatus of claim 11, wherein the at least one processor determines the portion of protected resources based in part on receiving an indication of the portion of protected resources from the base station.

16. An apparatus for measuring base station signals, comprising:
   means for determining a portion of protected resources from a set of resources related to a base station, wherein the portion of protected resources is allocated according to resource partitioning between the base station and one or more other base stations so that the base station can communicate over the portion of protected resources with reduced interference;
   means for obtaining signal measurements of one or more signals from the base station over at least the portion of protected resources; and
   means for generating a measurement value of the base station for cell reselection based on the signal measurements.

17. The apparatus of claim 16, wherein the means for obtaining obtains the signal measurements of the one or more signals from the base station over the set of resources, and wherein the means for determining determines the portion of protected resources based in part on the signal measurements over the set of resources.

18. The apparatus of claim 17, wherein the means for determining determines the portion of protected resources as resources corresponding to a portion of the signal measurements over the set of resources above a threshold signal quality.

19. The apparatus of claim 17, wherein the means for determining specifies the portion of protected resources to the means for obtaining signal measurements for measuring subsequent signals from the base station.

20. The apparatus of claim 16, wherein the means for determining receives an indication of the portion of protected resources from the base station.

21. A computer program product for measuring signals from one or more base stations, comprising:
   a computer-readable medium, comprising:
   code for causing at least one computer to determine a portion of protected resources from a set of resources related to a base station, wherein the portion of protected resources is allocated according to resource partitioning between the base station and one or more other base stations so that the base station can communicate over the portion of protected resources with reduced interference;
   code for causing the at least one computer to obtain signal measurements of one or more signals from the base station over at least the portion of protected resources; and
   code for causing the at least one computer to generate a measurement value of the base station for cell reselection based on the signal measurements.

22. The computer program product of claim 21, wherein the code for causing the at least one computer to obtain obtains the signal measurements of the one or more signals from the base station over the set of resources, and wherein the code for causing the at least one computer to determine determines the portion of protected resources based in part on the signal measurements over the set of resources.

23. The computer program product of claim 22, wherein the code for causing the at least one computer to determine determines the portion of protected resources as resources corresponding to a portion of the signal measurements over the set of resources that are above a threshold signal quality.

24. The computer program product of claim 22, wherein the computer-readable medium further comprises code for causing the at least one computer to utilize the portion of protected resources in generating a subsequent measurement value of the base station.

25. The computer program product of claim 21, wherein the code for causing the at least one computer to determine determines the portion of protected resources
based in part on receiving an indication of the portion of protected resources from the base station.

26. An apparatus for measuring base station signals, comprising:
a protected resource determining component for determining a portion of protected resources from a set of resources related to a base station, wherein the portion of protected resources is allocated according to resource partitioning between the base station and one or more other base stations so that the base station can communicate over the portion of protected resources with reduced interference;
a resource measuring component for obtaining signal measurements of one or more signals from the base station over at least the portion of protected resources; and
a measurement value generating component for generating a measurement value of the base station for cell reselection based on the signal measurements.

27. The apparatus of claim 26, wherein the resource measuring component obtains the signal measurements of the one or more signals from the base station over the set of resources, and wherein the protected resource determining component determines the portion of protected resources based in part on the signal measurements over the set of resources.

28. The apparatus of claim 27, wherein the protected resource determining component determines the portion of protected resources as resources corresponding to a portion of the signal measurements over the set of resources above a threshold signal quality.

29. The apparatus of claim 27, wherein the protected resource determining component specifies the portion of protected resources to the resource measuring component for measuring subsequent signals from the base station.

30. The apparatus of claim 26, wherein the protected resource determining component receives an indication of the portion of protected resources from the base station.

31. The apparatus of claim 26, wherein the resource measuring component obtains the signal measurements over at least the portion of protected resources based in part on the determining the portion of protected resources.

32. The apparatus of claim 31, wherein the resource measuring component obtains the signal measurements over at least the portion of protected resources further based in part on determining that a femto node that implements restricted association has a higher signal quality than the base station.

33. The apparatus of claim 32, wherein the resource measuring component obtains the signal measurements over at least the portion of protected resources further based in part on determining that a signal quality of the base station is degrading based in part on one or more previous signal measurements.

34. The apparatus of claim 26, wherein the protected resource determining component determines the portion of protected resources as utilized by the base station for transmitting paging signals.

35. The apparatus of claim 26, wherein the protected resource determining component determines the portion of protected resources based on a previous resource assignment from the base station.

36. A method of wireless communication, comprising:
determining a portion of protected resources from a set of resources related to a base station;
obtaining signal measurements of one or more signals from the base station over at least the portion of protected resources; and
generating a measurement value of the base station for cell reselection based on the signal measurements;
wherein the obtaining the signal measurements further comprises obtaining the signal measurements of the one or more signals from the base station over the set of resources; and
wherein the determining the portion of protected resources is based in part on the signal measurements over the set of resources.

37. A method of wireless communication, comprising:
determining a portion of protected resources from a set of resources related to a base station;
obtaining signal measurements of one or more signals from the base station over at least the portion of protected resources; and
generating a measurement value of the base station for cell reselection based on the signal measurements;
wherein the obtaining the signal measurements over at least the portion of protected resources is based in part on the determining the portion of protected resources; and
wherein the obtaining the signal measurements over at least the portion of protected resources is further based in part on determining that a femto node that implements restricted association has a higher signal quality than the base station.

* * * * *